United States Patent
Liu et al.

(10) Patent No.: US 12,200,501 B2
(45) Date of Patent: Jan. 14, 2025

(54) RESOURCE RESERVATION FOR SIDELINK COMMUNICATIONS IN SHARED RADIO FREQUENCY SPECTRUM

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US); Tao Luo, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 678 days.

(21) Appl. No.: 17/406,804

(22) Filed: Aug. 19, 2021

(65) Prior Publication Data

US 2022/0095117 A1   Mar. 24, 2022

Related U.S. Application Data

(60) Provisional application No. 63/081,769, filed on Sep. 22, 2020.

(51) Int. Cl.
*H04W 16/14* (2009.01)
*H04W 72/20* (2023.01)
*H04W 74/0808* (2024.01)

(52) U.S. Cl.
CPC ........... *H04W 16/14* (2013.01); *H04W 72/20* (2023.01); *H04W 74/0808* (2013.01)

(58) Field of Classification Search
CPC . H04W 16/14; H04W 72/20; H04W 74/0808; H04W 76/14; H04W 92/18; H04W 74/0816; H04L 1/1887
USPC .......................................................... 370/329
See application file for complete search history.

(56) References Cited

U.S. PATENT DOCUMENTS

| | | | |
|---|---|---|---|
| 2020/0029340 A1* | 1/2020 | He | H04W 72/56 |
| 2020/0383110 A1* | 12/2020 | Kusashima | H04W 72/0446 |
| 2021/0219322 A1* | 7/2021 | Chin | H04L 1/1893 |
| 2021/0368351 A1* | 11/2021 | Cui | H04W 74/0808 |
| 2023/0146718 A1* | 5/2023 | Lei | H04L 1/1607 370/329 |

* cited by examiner

*Primary Examiner* — Kwang B Yao
*Assistant Examiner* — Syed M Bokhari
(74) *Attorney, Agent, or Firm* — Holland & Hart LLP/Qualcomm

(57) ABSTRACT

Methods, systems, and devices for wireless communications are described in which a first user equipment (UE) may transmit a first communication to a second UE during a first channel occupancy time (COT). The first UE may reserve resources of one or more subsequent COTs for one or more repetitions of the first communication. The reserved resources may be identified based at least in part on a two stage resource reservation, in which reserved resources are identified relative to a timing of the one or more subsequent COTs. Such a UE may first determine a timing of a second COT and may then determine a timing of the reserved resources based on the timing of the second COT. The reserved resources may be identified based at least in part on one or more offsets from a starting time of the second COT.

30 Claims, 22 Drawing Sheets

RESOURCE RESERVATION FOR SIDELINK COMMUNICATIONS IN SHARED RADIO FREQUENCY SPECTRUM

CROSS REFERENCE

The present Application for Patent claims the benefit of U.S. Provisional Patent Application No. 63/081,769 by LIU et al., entitled "RESOURCE RESERVATION FOR SIDELINK COMMUNICATIONS IN SHARED RADIO FREQUENCY SPECTRUM," filed Sep. 22, 2020, assigned to the assignee hereof, and expressly incorporated by reference herein.

FIELD OF TECHNOLOGY

The following relates to wireless communications, including resource reservation for sidelink communications in shared radio frequency spectrum.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some deployments, UEs may communicate with one or more base stations using an access link (e.g., via a Uu interface in a 4G or 5G system). Further, some UEs may communicate directly with one or more other UEs using a sidelink (e.g., a PC5 interface), such that the UEs communicate directly rather than through a base station for some communications. In some cases, reliability of communications between UEs may be enhanced through one or more repetitions of a transmission, in which a transmitting UE may transmit two or more instances of a communication. Efficient identification and use of sidelink resources in such deployments may help to enhance the efficiency, reliability, and latency of a network, and thus may be desirable.

SUMMARY

The described techniques relate to improved methods, systems, devices, and apparatuses that support resource reservation for sidelink communications in shared radio frequency spectrum. In accordance with various aspects of the present disclosure, a first user equipment (UE) may transmit a first communication to a second UE during a first channel occupancy time (COT), and may reserve resources of one or more subsequent COTs for one or more repetitions of the first communication. In some cases, the reserved resources may be identified based at least in part on a two stage resource reservation, in which reserved resources are identified relative to a timing of the one or more subsequent COTs. Such a UE may first determine a timing of a second COT and may then determine a timing of the reserved resources based on the timing of the second COT. In some cases, the reserved resources may be identified based at least in part on one or more offsets from a starting time of the second COT. The first UE may transmit one or more additional instances of the first communication using the reserved resources.

In some cases, an indication of the reserved resources may be provided with sidelink control information (SCI) that is transmitted by the first UE. In some cases, one or more of the COTs may be shared COTs that are obtained by a different UE than the first UE. In some cases, the first UE may use reserved resources in a shared COT based on a location of the first UE and a location of a third UE that obtained the shared COT. In such cases, the first UE may identify one or more reserved resources in the shared COT for the one or more retransmissions when the first UE is within a predetermined distance of the third UE. In some cases, the location of the first UE relative to the third UE may be based at least on one or more of a zone identification of the third UE matching the zone identification of the first UE, a global navigation satellite system (GNSS) location indication, or any combinations thereof.

A method of wireless communication at a first UE is described. The method may include transmitting a first communication to at least a second UE during a first channel occupancy time of the first UE for sidelink communications in a shared radio frequency spectrum band, reserving at least a first resource for a retransmission of the first communication in a second channel occupancy time for sidelink communications in the shared radio frequency spectrum band, where the first resource is indicated relative to a start time of the second channel occupancy time, determining, after the reserving, the start time of the second channel occupancy time in the shared radio frequency spectrum band, identifying a timing for the first resource based on the determined start time of the second channel occupancy time, and retransmitting the first communication to at least the second UE using the first resource.

An apparatus for wireless communication at a first UE is described. The apparatus may include a processor, memory coupled with the processor, and instructions stored in the memory. The instructions may be executable by the processor to cause the apparatus to transmit a first communication to at least a second UE during a first channel occupancy time of the first UE for sidelink communications in a shared radio frequency spectrum band, reserve at least a first resource for a retransmission of the first communication in a second channel occupancy time for sidelink communications in the shared radio frequency spectrum band, where the first resource is indicated relative to a start time of the second channel occupancy time, determine, after the reserving, the start time of the second channel occupancy time in the shared radio frequency spectrum band, identify a timing for the first resource based on the determined start time of the second channel occupancy time, and retransmit the first communication to at least the second UE using the first resource.

Another apparatus for wireless communication at a first UE is described. The apparatus may include means for transmitting a first communication to at least a second UE during a first channel occupancy time of the first UE for sidelink communications in a shared radio frequency spectrum band, reserving at least a first resource for a retransmission of the first communication in a second channel occupancy time for sidelink communications in the shared radio frequency spectrum band, where the first resource is indicated relative to a start time of the second channel occupancy time, determining, after the reserving, the start time of the second channel occupancy time in the shared radio frequency spectrum band, identifying a timing for the first resource based on the determined start time of the second channel occupancy time, and retransmitting the first communication to at least the second UE using the first resource.

A non-transitory computer-readable medium storing code for wireless communication at a first UE is described. The code may include instructions executable by a processor to transmit a first communication to at least a second UE during a first channel occupancy time of the first UE for sidelink communications in a shared radio frequency spectrum band, reserve at least a first resource for a retransmission of the first communication in a second channel occupancy time for sidelink communications in the shared radio frequency spectrum band, where the first resource is indicated relative to a start time of the second channel occupancy time, determine, after the reserving, the start time of the second channel occupancy time in the shared radio frequency spectrum band, identify a timing for the first resource based on the determined start time of the second channel occupancy time, and retransmit the first communication to at least the second UE using the first resource.

Some examples of the method, apparatuses, and non-transitory computer-readable medium described herein may further include operations, features, means, or instructions for transmitting, to one or more other UEs, sidelink control information that indicates one or more of the first channel occupancy time or the second channel occupancy time. In some examples of the method, apparatuses, and non-transitory computer-readable medium described herein, the transmitting the sidelink control information may include operations, features, means, or instructions for transmitting, within the first channel occupancy time, two or more instances of the sidelink control information, where each instance of the sidelink control information indicates the first channel occupancy time. In some examples of the method, apparatuses, and non-transitory computer-readable medium described herein, each instance of the sidelink control information indicates an offset between the instance of the sidelink control information and a start of the first channel occupancy time.

In some examples of the method, apparatuses, and non-transitory computer-readable medium described herein, the reserving the first resource may include operations, features, means, or instructions for transmitting, to one or more other UEs, an indication of a relative slot offset between the start time of the second channel occupancy time and the first resource. In some examples of the method, apparatuses, and non-transitory computer-readable medium described herein, the indication of the relative slot offset between the start time of the second channel occupancy time and the first resource is indicated in a sidelink control information transmission.

In some examples of the method, apparatuses, and non-transitory computer-readable medium described herein, the determining the start time of the second channel occupancy time may include operations, features, means, or instructions for determining that a listen-before-talk procedure associated with the second channel occupancy time has obtained the shared radio frequency spectrum band for the sidelink communications, and determining the start time of the second channel occupancy time based on a completion time of the listen-before-talk procedure. In some examples of the method, apparatuses, and non-transitory computer-readable medium described herein, the first resource expires based on a predetermined window after the first communication. In some examples of the method, apparatuses, and non-transitory computer-readable medium described herein, the predetermined window corresponds to a predetermined number of channel occupancy times after the first communication, a predetermined time period after the first communication, or any combinations thereof. In some examples of the method, apparatuses, and non-transitory computer-readable medium described herein, the reserving of at least the first resource includes reserving periodic resources and the predetermined window applies to each period of the periodic resources.

Some examples of the method, apparatuses, and non-transitory computer-readable medium described herein may further include operations, features, means, or instructions for transmitting, during the second channel occupancy time, an indication that the first resource is used or unused for retransmission of the first communication. In some examples of the method, apparatuses, and non-transitory computer-readable medium described herein, the indication may be provided in sidelink control information that is transmitted during the second channel occupancy time. In some examples of the method, apparatuses, and non-transitory computer-readable medium described herein, the sidelink control information includes a bitmap that provides the indication, where each bit of the bitmap corresponds to a reserved resource in the second channel occupancy time.

In some examples of the method, apparatuses, and non-transitory computer-readable medium described herein, the second channel occupancy time may be obtained by a third UE for sidelink communications in the shared radio frequency spectrum band. Some examples of the method, apparatuses, and non-transitory computer-readable medium described herein may further include operations, features, means, or instructions for receiving, from the third UE, sidelink control information that identifies the second channel occupancy time and a shared channel occupancy time for the sidelink communications in the shared radio frequency spectrum band. In some examples of the method, apparatuses, and non-transitory computer-readable medium described herein, the timing of the first resource is based on the sidelink control information from the third UE.

In some examples of the method, apparatuses, and non-transitory computer-readable medium described herein, the first resource is indicated by a slot offset to a channel occupancy time that is obtained by a different UE. In some examples of the method, apparatuses, and non-transitory computer-readable medium described herein, the first resource is indicated by a slot offset to a boundary of the second channel occupancy time that is obtained by the third UE. In some examples of the method, apparatuses, and non-transitory computer-readable medium described herein, the first resource is indicated by a slot offset from a start of the shared channel occupancy time that is indicated by the third UE. In some examples of the method, apparatuses, and non-transitory computer-readable medium described herein, the sidelink control information from the third UE indicates a duration of the shared channel occupancy time, and where the timing of the first resource is determined based on the duration of the shared channel occupancy time. In some examples of the method, apparatuses, and non-transitory computer-readable medium described herein, a reservation of the first resource expires based on a predetermined window after the first communication, one or more shared channel occupancy times subsequent to the first communication, or any combinations thereof.

Some examples of the method, apparatuses, and non-transitory computer-readable medium described herein may further include operations, features, means, or instructions for receiving, from a third UE, sidelink control information that indicates a shared channel occupancy time and a zone identification, and determining whether the shared channel occupancy time is available as the second channel occupancy time based on the zone identification. Some examples of the method, apparatuses, and non-transitory computer-readable medium described herein may further include operations, features, means, or instructions for determining that a distance between the first UE and a location associated with the zone identification is less than a threshold value, and where the shared channel occupancy time is available as the second channel occupancy time based on the distance being less than the threshold value. In some examples of the method, apparatuses, and non-transitory computer-readable medium described herein, the location associated with the zone identification is a location of the third UE. Some examples of the method, apparatuses, and non-transitory computer-readable medium described herein may further include operations, features, means, or instructions for determining, based on a global navigation satellite system, a first location of the first UE, and where the determining that the distance is less than the threshold value is based on the first location and the location associated with the zone identification. In some examples of the method, apparatuses, and non-transitory computer-readable medium described herein, the zone identification corresponds to a group identification provided by a network node, and where the shared channel occupancy time is available as the second channel occupancy time when the group identification of the first UE is the same as the group identification of the third UE.

In some examples of the method, apparatuses, and non-transitory computer-readable medium described herein, the sidelink control information from the third UE is forwarded by one or more other UEs. In some examples of the method, apparatuses, and non-transitory computer-readable medium described herein, the one or more other UEs act as relay nodes for the sidelink control information and include a UE identification of the third UE that obtained the second channel occupancy time.

A method of wireless communication at a second UE is described. The method may include receiving, from a first UE, a first communication during a first channel occupancy time for sidelink communications in a shared radio frequency spectrum band, receiving, from the first UE, an indication of at least a first reserved resource for a retransmission of the first communication in a second channel occupancy time for sidelink communications in the shared radio frequency spectrum band, where the first reserved resource is indicated relative to a start time of the second channel occupancy time, determining, after the first channel occupancy time, the start time of the second channel occupancy time in the shared radio frequency spectrum band, and identifying a timing for the first reserved resource based on the determined start time of the second channel occupancy time.

An apparatus for wireless communication at a second UE is described. The apparatus may include a processor, memory coupled with the processor, and instructions stored in the memory. The instructions may be executable by the processor to cause the apparatus to receive, from a first UE, a first communication during a first channel occupancy time for sidelink communications in a shared radio frequency spectrum band, receive, from the first UE, an indication of at least a first reserved resource for a retransmission of the first communication in a second channel occupancy time for sidelink communications in the shared radio frequency spectrum band, where the first reserved resource is indicated relative to a start time of the second channel occupancy time, determine, after the first channel occupancy time, the start time of the second channel occupancy time in the shared radio frequency spectrum band, and identify a timing for the first reserved resource based on the determined start time of the second channel occupancy time.

Another apparatus for wireless communication at a second UE is described. The apparatus may include means for receiving, from a first UE, a first communication during a first channel occupancy time for sidelink communications in a shared radio frequency spectrum band, receiving, from the first UE, an indication of at least a first reserved resource for a retransmission of the first communication in a second channel occupancy time for sidelink communications in the shared radio frequency spectrum band, where the first reserved resource is indicated relative to a start time of the second channel occupancy time, determining, after the first channel occupancy time, the start time of the second channel occupancy time in the shared radio frequency spectrum band, and identifying a timing for the first reserved resource based on the determined start time of the second channel occupancy time.

A non-transitory computer-readable medium storing code for wireless communication at a second UE is described. The code may include instructions executable by a processor to receive, from a first UE, a first communication during a first channel occupancy time for sidelink communications in a shared radio frequency spectrum band, receive, from the first UE, an indication of at least a first reserved resource for a retransmission of the first communication in a second channel occupancy time for sidelink communications in the shared radio frequency spectrum band, where the first reserved resource is indicated relative to a start time of the second channel occupancy time, determine, after the first channel occupancy time, the start time of the second channel occupancy time in the shared radio frequency spectrum band, and identify a timing for the first reserved resource based on the determined start time of the second channel occupancy time.

Some examples of the method, apparatuses, and non-transitory computer-readable medium described herein may further include operations, features, means, or instructions for receiving, from the first UE, sidelink control information that indicates one or more of the first channel occupancy time, the second channel occupancy time, the indication of the first reserved resource, or any combinations thereof. In some examples of the method, apparatuses, and non-transitory computer-readable medium described herein, the first UE transmits two or more instances of the sidelink control information, where each instance of the sidelink control information indicates the first channel occupancy time and an offset between the instance of the sidelink control information and a start of a channel occupancy time associated with the sidelink control information. In some examples of the method, apparatuses, and non-transitory computer-readable medium described herein, the indication of at least the first reserved resource includes a relative slot offset between the start time of the second channel occupancy time and the first reserved resource. In some examples of the method, apparatuses, and non-transitory computer-readable medium described herein, the first resource expires based on a predetermined window after the first communication, and where the predetermined window corresponds to a predetermined number of channel occupancy times after the first communication, a predetermined time period after the first communication, or any combinations thereof. Some examples of the method, apparatuses, and non-transitory computer-readable medium described herein may further include operations, features, means, or instructions for receiving, during the second channel occupancy time, an indication that the first resource is used or unused for retransmission of the first communication, and monitoring for the retransmission of the first communication based on the indication that the first resource is used for the retransmission of the first communication.

In some examples of the method, apparatuses, and non-transitory computer-readable medium described herein, the second channel occupancy time is obtained by a third UE for sidelink communications in the shared radio frequency spectrum band. Some examples of the method, apparatuses, and non-transitory computer-readable medium described herein may further include operations, features, means, or instructions for receiving, from the third UE, sidelink control information that identifies the second channel occupancy time and a shared channel occupancy time for the sidelink communications in the shared radio frequency spectrum band. In some examples of the method, apparatuses, and non-transitory computer-readable medium described herein, the timing of the first reserved resource is based on the sidelink control information from the third UE. In some examples of the method, apparatuses, and non-transitory computer-readable medium described herein, the first reserved resource is indicated by a slot offset to a boundary of the second channel occupancy time that is obtained by the third UE. In some examples of the method, apparatuses, and non-transitory computer-readable medium described herein, the first resource is indicated by a slot offset from a start of the shared channel occupancy time that is indicated by the third UE.

Some examples of the method, apparatuses, and non-transitory computer-readable medium described herein may further include operations, features, means, or instructions for receiving, from a third UE, sidelink control information that indicates a shared channel occupancy time and a zone identification, and determining whether the shared channel occupancy time is available as the second channel occupancy time based on the zone identification. In some examples of the method, apparatuses, and non-transitory computer-readable medium described herein, the zone identification corresponds to a group identification provided by a network node, and where the shared channel occupancy time is available as the second channel occupancy time when the group identification of the first UE is the same as the group identification of the third UE. In some examples of the method, apparatuses, and non-transitory computer-readable medium described herein, the sidelink control information from the third UE is forwarded by one or more other UEs.

DETAILED DESCRIPTION

Figure 1:
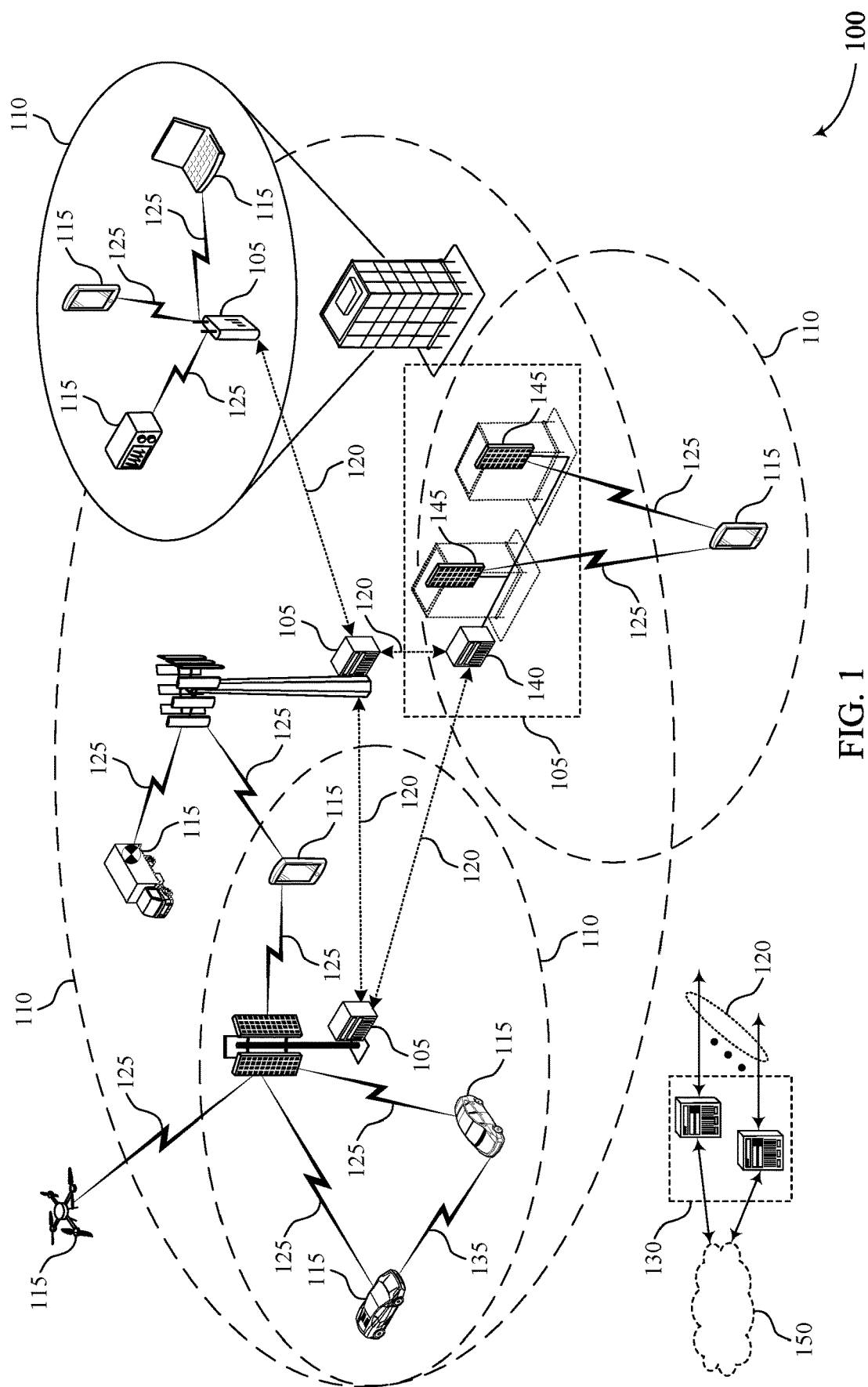
FIG. 1 illustrates an example of a system for wireless communications that supports resource reservation for sidelink communications in shared radio frequency spectrum in accordance with aspects of the present disclosure.

Some wireless communications systems may support both access links and sidelinks. An access link is a communication link between a user equipment (UE) and a base station. In some examples, an access link may be referred to as a Uu interface. Specifically, the Uu interface may refer to an over-the-air interface for downlink transmissions, uplink transmissions, or both. A sidelink is a communication link between similar devices and in some cases may be referred to as a PC5 interface. For example, a sidelink may support communications between multiple UEs (e.g., in a vehicle-to-everything (V2X) system, a vehicle-to-vehicle (V2V) system, a device-to-device (D2D) system, among other examples) between multiple base stations (e.g., in an integrated access and backhaul (IAB) deployment), or between other types of wireless communications devices. It is noted that while various examples provided herein are discussed for UE sidelink devices, techniques discussed herein may be used for any type of wireless devices that use shared radio frequency channels in which one or more instances of a communication transmitted in a first channel occupancy time (COT) may be retransmitted in one or more subsequent COTs based on a resource reservation of the transmitting device. For example, a sidelink may support one or more of D2D communications, V2X or V2V communications, message relaying, discovery signaling, beacon signaling, or other signals transmitted over-the-air from one wireless device to one or more other similar wireless devices.

In some cases, a base station may configure a set of resources for use in sidelink communications between UEs. For example, the base station may configure frame and slot timing, which may be used for UEs in sidelink communications. In some cases, the configured resources for sidelink UEs may include shared or unlicensed radio frequency spectrum in which devices that are to access a channel perform a contention-based channel access procedure that provides fair channel access to the unlicensed or shared radio frequency spectrum. For example, a UE may perform a listen before talk (LBT) procedure (e.g., a clear channel assessment (CCA)) and determine whether signals from another device are detected on a channel or sub-channel. In the event that other signals are not detected that are indicative of another device using the channel, the UE may determine that the channel is available and transmit a reservation signal to indicate to other UEs that the channel is reserved for a channel occupancy time (COT).

As discussed herein, in some cases a UE may transmit one or more repetitions of a communication in order to enhance the likelihood of successful reception of the communication. Such techniques may be used, for example, in cases where a communication has a high priority, where the communication has a relatively low latency target, where channel conditions are relatively unfavorable, or any combinations thereof. In systems that use licensed radio frequency spectrum, the availability of a channel to transmit one or more of such repetitions may be known based on scheduling of resources for UE communications. Thus, in such cases, a UE may be identify a set of resources for a communication and one or more sets of resources for repetitions of the communication. The communication and associated resources may then be transmitted using the identified resources. However, in cases where unlicensed or shared radio frequency spectrum is used for such communications, the availability of the channel may be dependent upon a successfully completed contention-based channel access procedure (e.g., a LBT or CCA procedure). Accordingly, resources for one or more repetitions of a communication may not be known if the repetitions are to occur in one or more subsequent COTs.

In accordance with various aspects described herein, resource reservations for one or more repetitions of a communication may be identified relative to a COT, and determined based on a COT timing. In some cases, a first UE may transmit a first communication to a second UE during a first COT, and may reserve resources of one or more subsequent COTs for one or more repetitions of the first communication. In some cases, the reserved resources may be identified based at least in part on a two stage resource reservation, in which reserved resources are identified relative to a timing of the one or more subsequent COTs. Such a UE may first determine a timing of a second COT and may then determine a timing of the reserved resources based on the timing of the second COT. In some cases, the reserved resources may be identified based at least in part on one or more offsets from a starting time of the second COT. The first UE may transmit one or more additional instances of the first communication using the reserved resources.

In some cases, an indication of the reserved resources may be provided with sidelink control information (SCI) that is transmitted by the first UE. In some cases, one or more of the COTs may be shared COTs that are obtained by a different UE than the first UE. In some cases, the first UE may use reserved resources in a shared COT based on a location of the first UE and a location of a third UE that obtained the shared COT. In such cases, the first UE may identify one or more reserved resources in the shared COT for the one or more retransmissions when the first UE is within a predetermined distance of the third UE. In some cases, the location of the first UE relative to the third UE may be based at least on one or more of a zone identification of the third UE matching the zone identification of the first UE, a global navigation satellite system (GNSS) location indication, or any combinations thereof.

Various aspects of the subject matter described herein may be implemented to realize one or more of the following potential advantages. The techniques employed by the described base stations and UEs may provide benefits and enhancements to the operation of a wireless communications system. For example, operations performed by the UEs may provide improvements to reliability and efficiency in communications using shared radio frequency spectrum with sidelink UEs and other devices that may contend for channel access to the shared radio frequency spectrum. Such improvements may enhance efficiency of wireless communications at a UE by allowing for reliable transmission and retransmission of communications, which may enhance the likelihood of successful receipt of the communications at a receiving device. The described techniques may thus include features for improvements to reliability in communications, and enhanced communications efficiency for sidelink UEs and other devices that use shared radio frequency spectrum through reduced channel contention procedures associated with retransmissions, among other benefits.

Aspects of the disclosure are initially described in the context of wireless communications systems. Various examples of resource reservations based on COT timing and UE location are then discussed. Aspects of the disclosure are further illustrated by and described with reference to apparatus diagrams, system diagrams, and flowcharts that relate to resource reservation for sidelink communications in shared radio frequency spectrum.

FIG. 1 illustrates an example of a wireless communications system 100 that supports resource reservation for sidelink communications in shared radio frequency spectrum in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, UEs 115 may use sidelink communications on shared radio frequency spectrum, and identify retransmission resources in accordance with various techniques as discussed herein. In some cases, a UE 115 may transmit a first communication during a first COT, and may reserve resources of one or more subsequent COTs for one or more repetitions of the first communication. The UE 115 may first determine a timing of a second COT and may then determine a timing of the reserved resources based on the timing of the second COT. In some cases, the reserved resources may be identified based at least in part on one or more offsets from a starting time of the second COT, and one or more additional instances of the first communication may be transmitted using the reserved resources.

Figure 2:
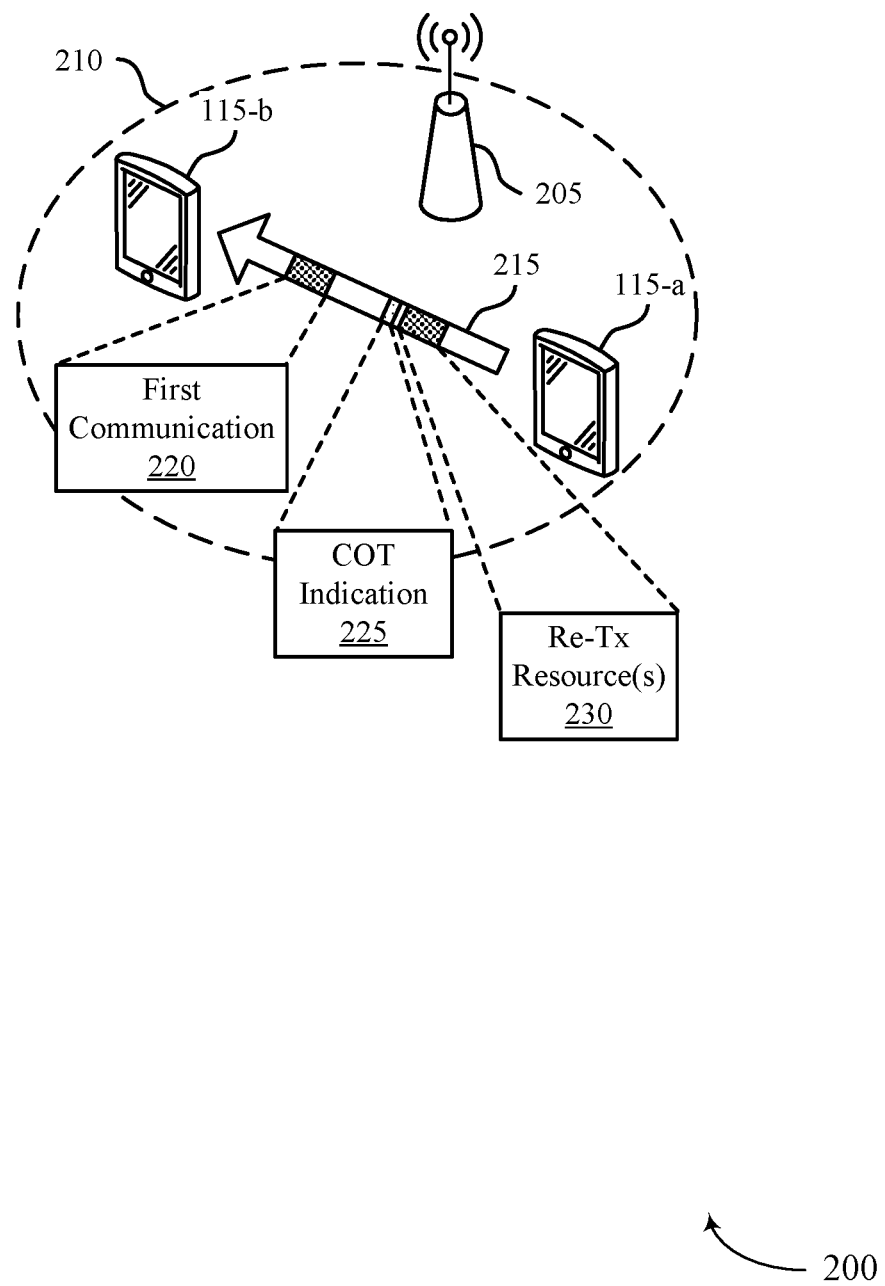
FIG. 2 illustrates an example of a portion of a wireless communications system that supports resource reservation for sidelink communications in shared radio frequency spectrum in accordance with aspects of the present disclosure.

FIG. 2 illustrates an example of a wireless communications system 200 that supports resource reservation for sidelink communications in shared radio frequency spectrum in accordance with aspects of the present disclosure. In some examples, wireless communications system 200 may implement aspects of wireless communications system 100. Wireless communications system 200 may include a base station 105-*a*, a first UE 115-*a*, and a second UE 115-*b* which may be examples of a base station 105 and UEs 115, respectively, described with reference to FIG. 1. In some cases, the first UE 115-*a* and the second UE 115-*b* may communicate with each other (e.g., within a V2X system, a D2D system, and the like) via sidelink communications.

In this example, each of the UEs 115 may be in a coverage area 210 (e.g., a coverage area with reference to FIG. 1) of the base station 105. In other examples, one or more UEs 115 may be outside of the coverage area 210. The first UE 115-*a*, the second UE 115-*b*, or both, may communicate with the base station 105-*a* via a respective access link (e.g., Uu links that may be used to provide downlink and uplink communications via the Uu interface). Further, UEs 115 may establish a sidelink (e.g., a PC5 link) that may be used for direct communications between the first UE 115-a and the second UE 115-b. It is noted that the example of FIG. 2 is provided for purposes of discussion and illustration only, and numerous other deployments are possible, such as cases where communications between the base station 105-a and one or more UEs 115 are relayed through another UE 115 (e.g., relayed using sidelink communications 215 when a UE 115 is outside of coverage area 110-a), cases where additional UEs 115 are present, cases where other types of UEs 115 or relays are present (e.g., roadside units in a V2X system), cases where UEs 115 are deployed in a factory automation or other industrial setting, or any combinations thereof, to name but a few examples. Techniques as discussed herein may be used in any such deployments.

In accordance with techniques discussed herein, the base station 105-a may provide configuration information to the first UE 115-a and the second UE 115-b related to sidelink communications. Such configuration information may include, for example, an indication of wireless resources that are allocated for sidelink communications 215 between the first UE 115-a and the second UE 115-b, which may include resources that use unlicensed or shared radio frequency spectrum. In the example of FIG. 2, the first UE 115-a may transmit a first communication 220 to the second UE 115-b (and optionally one or more other UEs). For example, the first UE 115-a may perform a contention-based channel access procedure and obtain a channel for a duration of a first COT that may be used to transmit the first communication 220. In some cases, the sidelink communications configuration may provide that the first UE 115-a may reserve resources for one or more retransmissions of the first communication 220 (e.g., the first UE 115-a may reserve resources for up to 3 repetitions of a transmission in a periodic pattern in which the period can be indicated in sidelink control information (SCI) by a value of a number of slots between retransmissions).

In some cases, resources for one or more retransmissions may be outside of the first COT that is used to transmit the first communication 220. In such cases, one or more repetitions may be transmitted in a subsequent COT, using resources that are identified based on a two stage resource reservation. In some cases, the first UE 115-a may perform a contention-based channel access procedure (e.g., a category 4 LBT) and obtain the channel for a second COT, and transmit a COT indication 225. The second COT may include retransmission resources 230 for the one or more repetitions of the first communication 220. In other cases, a different UE 115 may obtain the COT that may be used for retransmissions, and the first UE 115-a may use shared COT resources to determine the retransmission resources 230. Thus, different sidelink nodes may be a helper of other nodes by sharing portions of a secured COT with other nodes. For the retransmissions in a COT or a shared COT, the first UE 115-a may perform a shorter contention-based channel access procedure (e.g., a category 1 or 2 LBT) and then transmit the one or more retransmissions.

In some cases, the first UE 115-a may determine a location of retransmission resources based on a timing of a second COT. In such cases, the first UE 115-a may identify the reserved resources based at least in part on one or more offsets from a starting time of the second COT, and the one or more additional repetitions of the first communication may be transmitted using the reserved resources. Such techniques may allow for retransmissions using resources that are determined contingent on the first UE 115-a having channel access, which may enhance the reliability of sidelink communication relative to cases where reserved resources are located at a fixed time relative to resources of the first communication 220. Such techniques may also allow for reserved resources to be located in different COTs, which can reduce a density of reserved resources relative to cases where reserved resources are located within a same COT as an initial transmission, and also provide scheduling flexibility to schedule an initial transmission relatively late in a COT and thereby enhance system efficiency and reliability.

Figure 3:
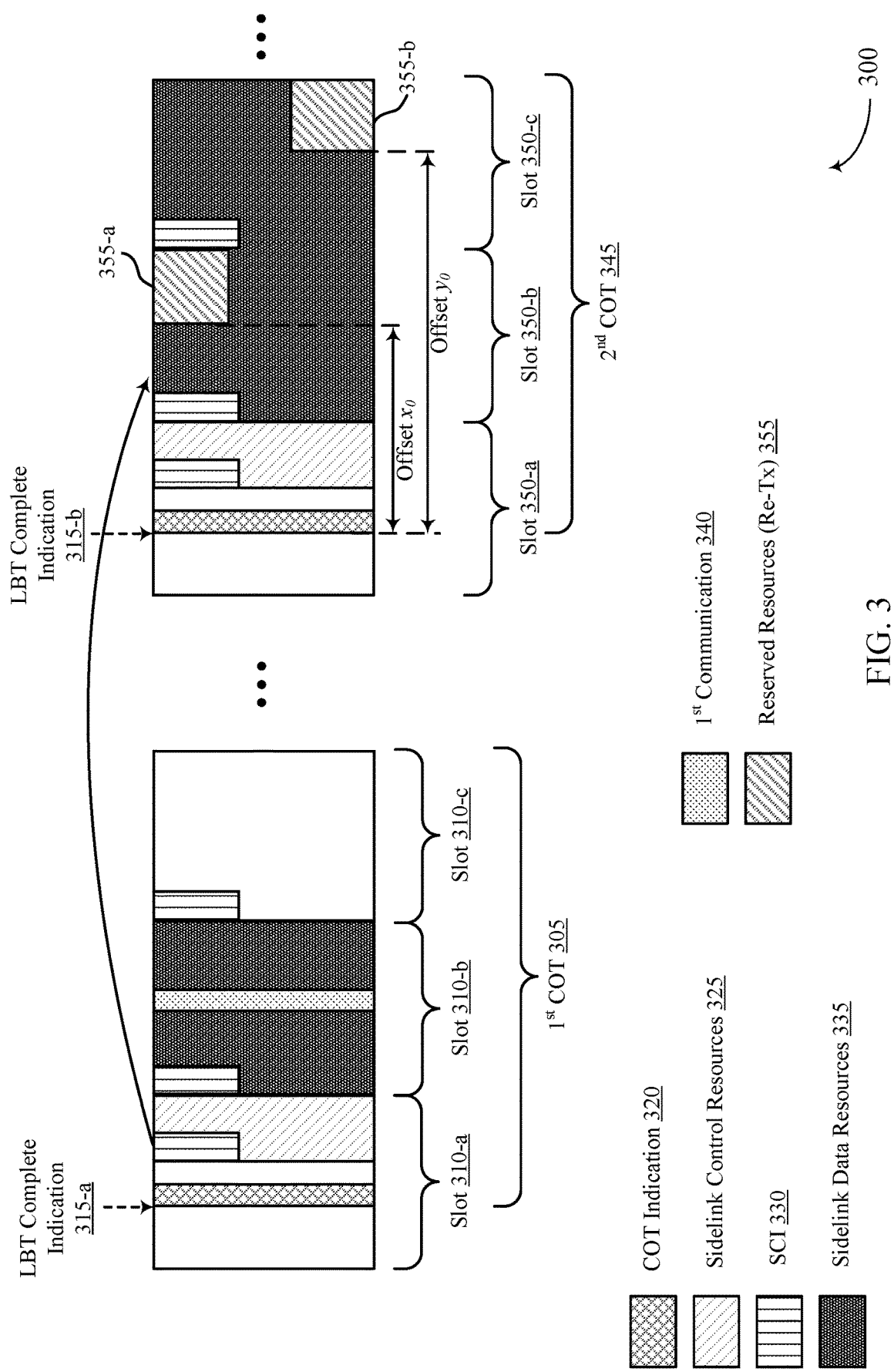
FIG. 3 illustrates an example of reserved resources in COTs that support sidelink communications in shared radio frequency spectrum in accordance with aspects of the present disclosure.

FIG. 3 illustrates an example of reserved resources in COTs 300 that supports resource reservation for sidelink communications in shared radio frequency spectrum in accordance with aspects of the present disclosure. In some examples, reserved resources in COTs 300 may implement aspects of wireless communications system 100 or 200. In this example, a first UE (e.g., a UE 115 of FIG. 1 or 2) may identify a first COT 305 that is available for sidelink communications with one or more other UEs, which includes a number of slots 310. The first COT 305, and one or more subsequent COTs, may be obtained directly by the first UE based on a LBT procedure (e.g., a category 4 LBT). In other cases, a different UE may obtain one or more COTs, as will be discussed in more detail with reference to FIGS. 4 through 7.

In the example of FIG. 3, a LBT complete indication 315-a may be provided for the first COT 305, which may be provided in a COT indication 320, which may signal to other UEs that the first COT 305 has been obtained and may indicate a duration of the COT. The first COT 305 may include sidelink control resources 325 and sidelink data resources 335, in accordance with a sidelink configuration that is provided by a serving base station (e.g., a base station of FIG. 1 or 2). The first UE may transmit SCI 330 that indicates that a first communication 340 is transmitted in the sidelink data resources 335, and may also indicate reserved resources 355 for one or more retransmissions of the first communication 340. In some cases, the reserved resources 355 may be located in a subsequent second COT 345 that is obtained based on a subsequent LBT procedure of the first UE. In some cases, the SCI 330 indicates the reserved resources 355 relative to a timing of the second COT 345, such as by indicating a first offset $x_0$ and a second offset $y_0$ from a start of a COT indication 320 in the second COT 345, from a start of a first slot 350-a of the second COT 345, or from an end of a last slot 350-c of the second COT 345. In the example of FIG. 3, offsets may be indicated relative to the COT indication 320 and the first offset $x_0$ may indicate a first instance of reserved resource 355-a in a second slot 350-b of the second COT 345, and the second offset $y_0$ may indicate a second instance of reserved resource 355-b in the last slot 350-c of the second COT 345. Such offset indications to identify the reserved resources 355 may reduce uncertainty associated with a location of reserved resources 355 that may result in delays in scheduling due to LBT procedures. Thus, the first UE may reserve resources inside or outside of the current COT used for an initial instance of a communication, depending on the timeline and COT duration.

In some cases, the reserved resources 355 may be indicated in SCI 330, which may indicate the one or more offset values relative to a start or end of a COT, and duration for the UE COT. In some cases, COT parameters may be carried in SCIs in multiple slots within the COT for COT detection robustness, and a receiving UE may not be in a receive mode in a first slot 350-a of the second COT 345. Thus, in some cases the indication of the reserved resources 355 in the second COT 345 may be provided relative to an end of the second COT 345. In other cases, the indication of the reserved resources may be provided relative to the start of the second COT 345, and the SCI 330 in later slots of a COT may indicate the start of the associated COT (e.g., a number of symbols since the start of the COT).

In some cases, reserved resources 355 may be valid for a predetermined time window following the first communication 340. For example, reserved resources 355 may be valid for a number of upcoming COTs or a preset time window starting from the first communication 340 or the first SCI 330 that indicates the reserved resources 355. In some cases, the time window may be configured in a sidelink configuration (e.g., provided by a serving base station via RRC signaling), provided in a MAC-CE, provided in the SCI 330, or any combinations thereof. In some cases, the reserved resources 355 may be periodic resources, and may be valid for a number of COTs or a preset time window starting from the first reserved resource SCI 330 in the beginning of each period. In some cases, a UE may provide an explicit trigger for reserved resources 355 in an upcoming COT that is obtained by the UE. For example, the UE may provide an explicit reserved resource trigger in SCI 330 (e.g., SCI-1 or SCI-2) that carries COT information for one or multiple reserved resources 355. In some cases, the reserved resource trigger may be a bitmap for each individual reserved resource 355 within a COT.

Figure 4:
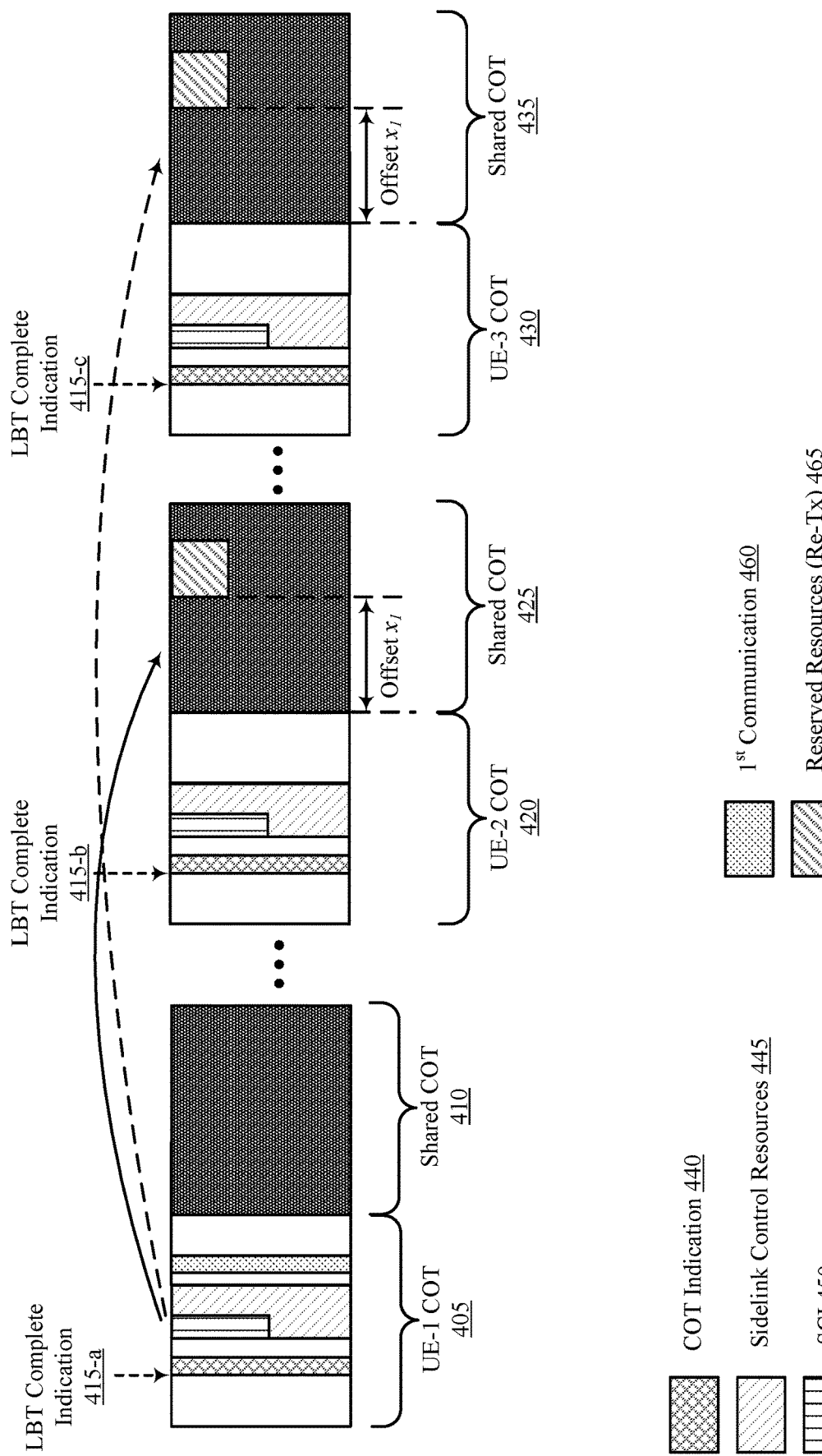
FIGS. 4 and 5 illustrate examples of shared COTs that support resource reservation for sidelink communications in shared radio frequency spectrum in accordance with aspects of the present disclosure.

FIG. 4 illustrates an example of a reserved resources in shared COTs 400 that supports resource reservation for sidelink communications in shared radio frequency spectrum in accordance with aspects of the present disclosure. In some examples, reserved resources in shared COTs 400 may implement aspects of wireless communications system 100 or 200. In this example, multiple UEs may share all or a portion of a COT with one or more other UEs, and reserved resources for repetitions of communications may be identified in shared COT resources.

For example, a first UE (e.g., a UE 115 of FIG. 1 or 2) may perform a LBT to obtain a shared channel and provide a first UE COT 405 for communications of the first UE and a first shared COT 410 that may be used by other UEs. The first UE may provide an LBT complete indication 415-a and a COT indication 440 that identifies the first UE COT 405 and the first shared COT 410. Similarly, a second UE may perform a LBT to obtain the shared channel and provide a second UE COT 420 and a second shared COT 425, and a third UE may perform a LBT to obtain the shared channel and provide a third UE COT 430 and a third shared COT 435. Thus, each of the UEs may provide some shared COT resources 455. In this example, the first UE may transmit a first communication 460 in first UE COT 405, and may indicate a timing for one or more reserved resources 465 (e.g., in SCI 450 transmitted in sidelink control resources 445).

In some cases, the reserved resources 465 may be determined based on a offset value xi relative to a start of a shared COT 425 or 435. In some cases, a UE that obtains a channel may signal shared COT related parameters in SCI 450 to other UEs (e.g., in groupcast SCI-2 or SCI-1). In some cases, the shared COT information may be combined with SI-COT and may be signaled in any slot before the shared COT start time (e.g., the shared COT information may indicate an offset and duration of the shared COT). By providing an indication of the reserved resources 456 relative to a shared COT start time, the first UE may be able to reduce LBT delay for retransmissions, as other UEs may act as helpers for securing a COT and the first UE may then transmit on reserved resources 465 using only a category 1 or 2 LBT (as opposed to a category 4 LBT) in the shared COT. In some cases, the reserved resources 465 may be indicated by the first UE in SCI 450 that indicates the relative slot offset in the shared COT of a different UE when the reserved resources 465 are outside of the first UE COT 405.

In some cases, the reserved resources 465 may be indicated based on a relative slot offset with respect to the beginning or the end of the COT of the different UE. In such cases, in the non-shared COT region or the other UE, the LBT may be blocked by the COT of the UE that obtained the channel, and the first UE may use the shared COT region of the different UE using a category 1 or 2 LBT. In some cases, the reserved resources 465 may be indicated based on a relative slot offset (e.g., $x_1$) with respect to the beginning of the indicated shared COT region, in which cases the LBT is not blocked by the COT of the other UE. In some cases, a UE may control whether to a COT is shared with other UEs, such as discussed with reference to the example of FIG. 5.

Figure 5:
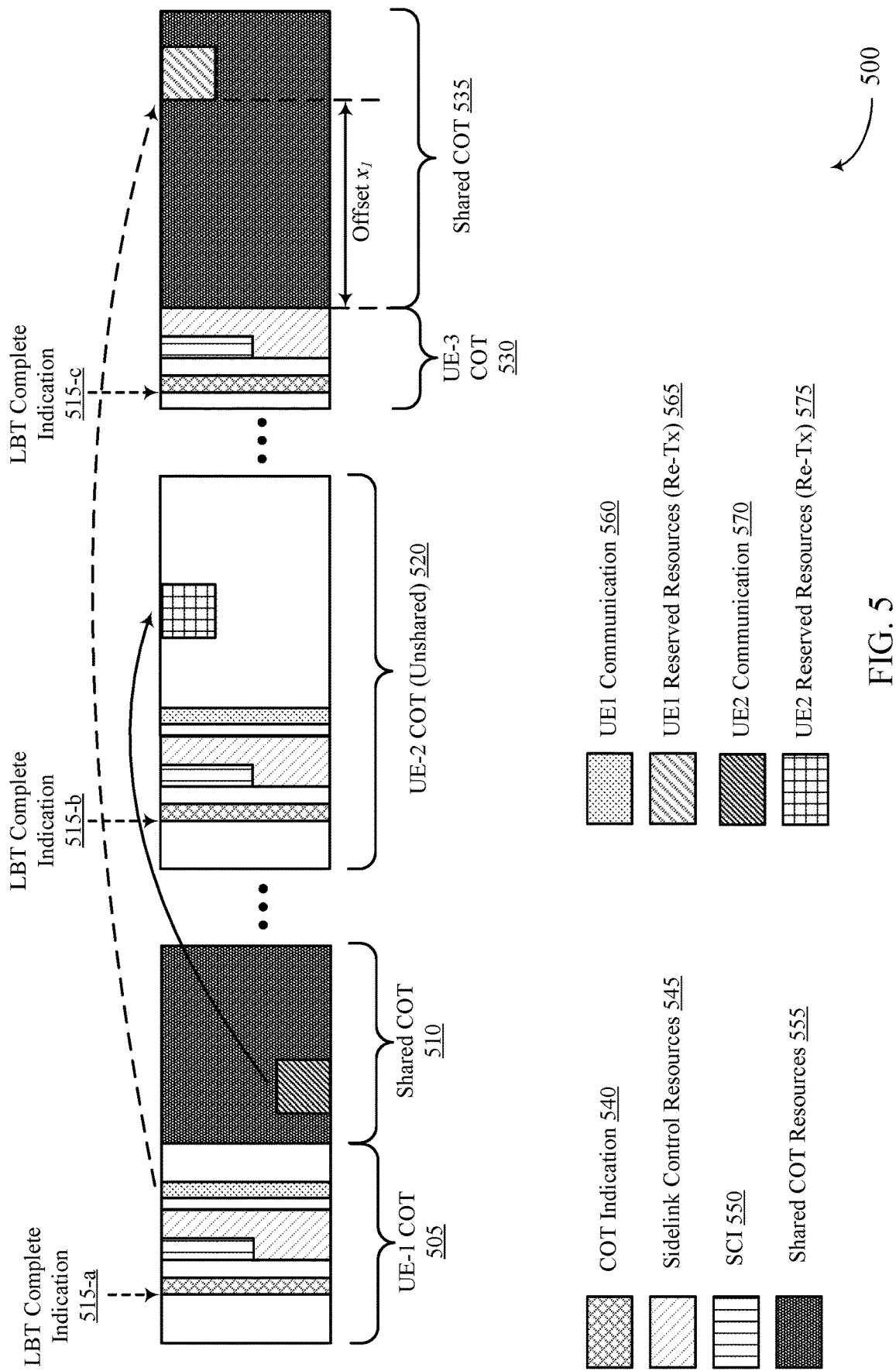

FIG. 5 illustrates an example of a reserved resources in shared COTs 500 that supports resource reservation for sidelink communications in shared radio frequency spectrum in accordance with aspects of the present disclosure. In some examples, reserved resources in shared COTs 500 may implement aspects of wireless communications system 100 or 200. In this example, multiple UEs may share all or a portion of a COT with one or more other UEs, and reserved resources for repetitions of communications may be identified in shared COT resources 555.

For example, a first UE (e.g., a UE 115 of FIG. 1 or 2) may perform a LBT to obtain a shared channel and provide a first UE COT 505 for communications of the first UE and a first shared COT 510 that may be used by other UEs. In this example a second UE may transmit a second UE communication 570 in the first shared COT 510, and the first UE may transmit a first UE communication 560 in the first UE COT 505. The first UE may provide an LBT complete indication 515 and a COT indication 540 that identifies the first UE COT 505 and the first shared COT 510. In this example, the second UE may perform a LBT to obtain the shared channel and provide a second UE COT 520 that is unshared with other UEs. A third UE may perform a LBT to obtain the shared channel and provide a third UE COT 530 and a second shared COT 535. In this example, the first UE may transmit the first UE communication 560 in first UE COT 505, and may indicate a timing for one or more first UE reserved resources 565 (e.g., in SCI 550 transmitted in sidelink control resources 545).

In this example, the second UE may transmit a second UE communication 570 in the first shared COT 510, and may indicate a timing for associated second UE reserved resources 575. In some cases, a UE may control whether to allow reserved resources from other UEs by allowing COT sharing or not based on an indicated COT sharing duration (e.g., that is indicated in SCI 550). If the shared COT duration is zero, then other UEs have no reserved resources in the current COT and will wait for next COT, and reserved resources of the UE initiating the COT may be valid. In the example of FIG. 5, the second UE reserved resources 575 are valid in the second UE COT 520, but the first UE reserved resources are not valid in the second UE COT 520, and thus the first UE waits for a subsequent COT for retransmissions of the first UE communication 560, either in its own COT or a shared COT of a different UE. In this example, a third UE may provide second shared COT 535, and the first UE reserved resources 565 may be identified in the second shared COT 535 based on offset xi. Thus, in this example, the third UE acts as a helper for other UE by clearing the LBT and assigning the whole COT (except for the COT indication slot at the beginning of COT) to all other UEs as a shared COT. In some cases, a time window may be associated with reserved resources following an initial communication by a UE, and reserved resources associated with a transmission may expire based on an expiration of the time window, similarly as discussed with reference to FIG. 3. In some cases, when using a shared COT for a communication, a hidden node may generate interference with a UE that is using a shared COT of a different UE, such as in cases where the hidden node is far enough away from the different UE that the COT indication is not received but close enough to cause interference with a UE that uses the shared COT. Examples of such hidden nodes and techniques associated with same are discussed with reference to FIGS. 6 and 7.

Figure 6:
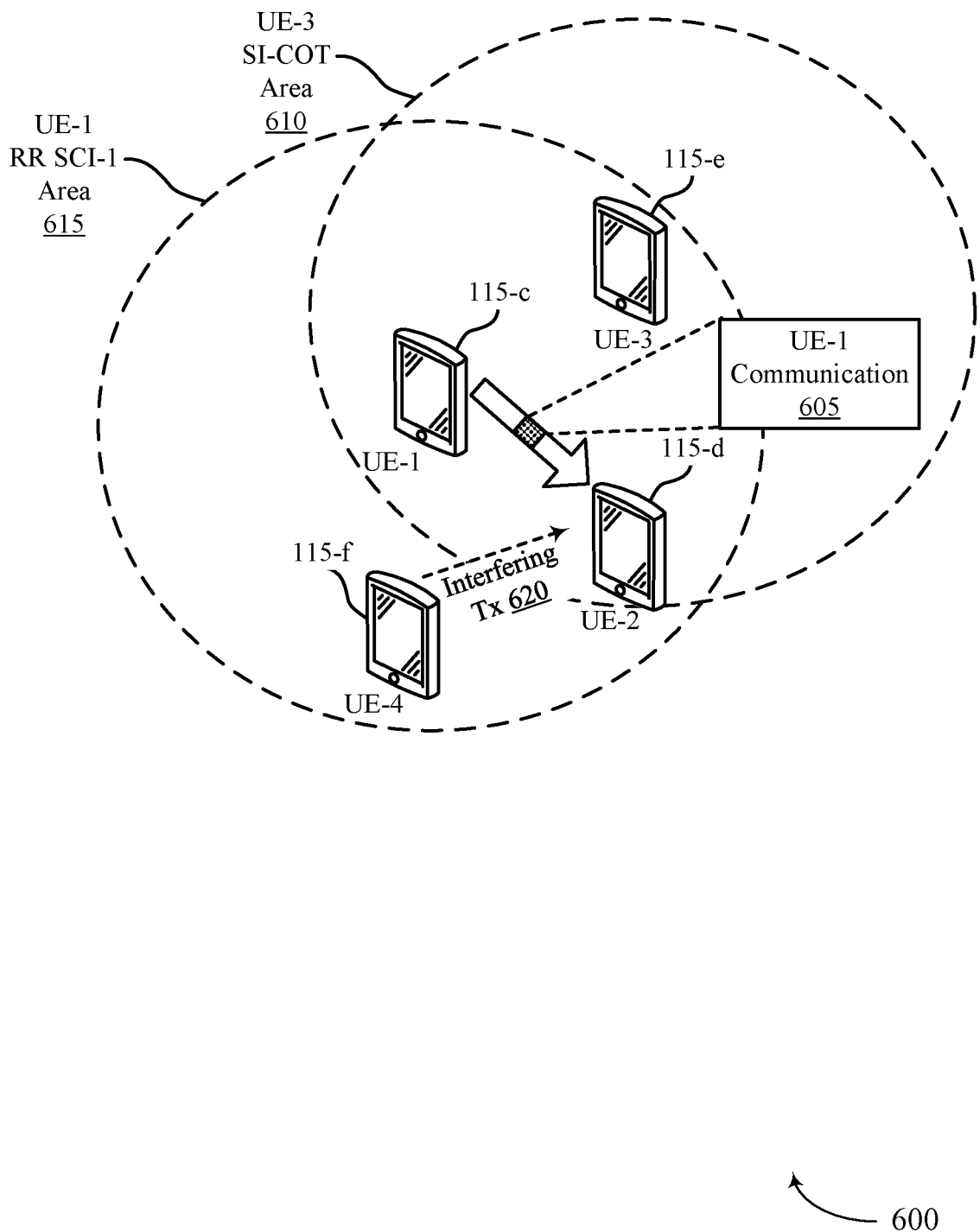
FIGS. 6 and 7 illustrate examples of portions of wireless communications systems that support resource reservation for sidelink communications in shared radio frequency spectrum in accordance with aspects of the present disclosure.

FIG. 6 illustrates an example of a portion of a wireless communications system 600 that supports resource reservation for sidelink communications in shared radio frequency spectrum in accordance with aspects of the present disclosure. In some examples, portion of a wireless communications system 600 may implement aspects of wireless communications system 100 or 200. In this example, a first UE 115-*c* may transmit a first UE communication 605 to a second UE 115-*d*. In some cases, the first UE 115-*c* may use a portion of a shared COT that is obtained by a third UE 115-*e* for a retransmission based on a resource reservation that may be received by devices within a first UE resource reservation SCI area 615.

Figure 7:
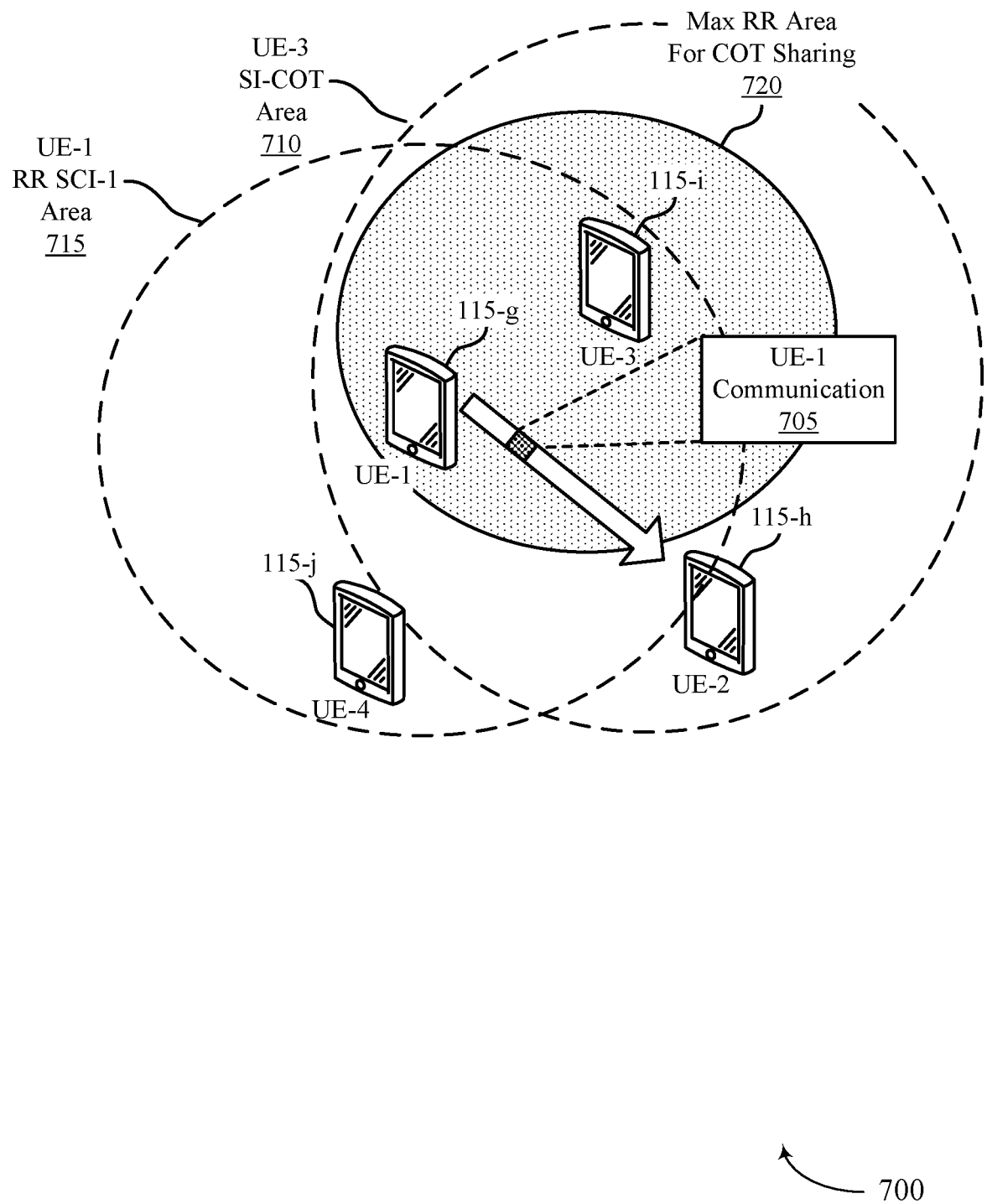

In some cases, the third UE 115-*e* may have an associated SI-COT area 610 in which devices within this area reliably receive a COT indication from the third UE 115-*e* and refrain from transmissions during the COT unless using a shared portion of the COT in accordance with COT sharing techniques. However, a fourth UE 115-*f* may be outside of the SI-COT area 610 of the third UE 115-*e*. Thus, the fourth UE 115-*f* may initiate a transmission during the COT of the third UE 115-*e*, which may result in an interfering transmission 620 that interferes with the first UE 115-*c* communication 605. In some cases, the first UE 115-*c* may use the shared COT of the third UE 115-*e* in cases where the first UE 115-*c* and the third UE 115-*e* are relatively close to each other, and thus the likelihood of a different UE (e.g., fourth UE 115-*f*) transmitting using reserved resources of the first UE 115-*c* is reduced. FIG. 7 illustrates an example of such proximity-based determination of whether to use a shared COT.

FIG. 7 illustrates an example of a portion of a wireless communications system 700 that supports resource reservation for sidelink communications in shared radio frequency spectrum in accordance with aspects of the present disclosure. In some examples, portion of a wireless communications system 700 may implement aspects of wireless communications system 100, 200, or 600. In this example, a first UE 115-*g* may transmit a first UE communication 705 to a second UE 115-*h*. In some cases, the first UE 115-*g* may use a portion of a shared COT that is obtained by a third UE 115-*i* for a retransmission based on a resource reservation that may be received by devices within a first UE resource reservation SCI area 715. In this example, the first UE 115-*g* may use the shared COT of the third UE 115-*i* if the first UE 115-*g* is within a maximum resource reservation area for COT sharing 720.

Similarly as in the example of FIG. 6, the third UE 115-*i* may have an associated SI-COT area 710 in which devices within this area reliably receive a COT indication from the third UE 115-*i* and refrain from transmissions during the COT unless using a shared portion of the COT in accordance with COT sharing techniques. In this example, to prevent potential interference from the fourth UE 115-*j*, the first UE 115-*g* may use the shared COT if the first UE 115-*g* is within the maximum resource reservation area for COT sharing 720 of the third UE 115-*i*. Such techniques may protect the second UE 115-*h* from interference from the fourth UE 115-*j*, which may be within the first UE resource reservation SCI area 715 but not within the resource reservation area for COT sharing 720. In some cases, the first UE 115-*g* may determine whether it is within a predetermined distance of the third UE 115-*i*, and use the shared COT based on the determination.

In some cases, the first UE 115-*g* may use the shared COT if a zone identification of the third UE 115-*i* matches a zone identification of the first UE 115-*g*, which may indicate that both UEs are in a same sidelink cluster and relatively close in proximity. In some cases, a zone identification may be included with a COT sharing parameter transmitted by the third UE 115-*i* in SCI, and other nodes use the shared COT only if they have the same zone identification. In other cases, the first UE 115-*g* may estimate a proximity to the third UE 115-*i*, and may use the shared COT if the distance to the COT sharing UE is below a threshold value. In such cases, each node may calculate the relative distance based on the zone identification signaled in SI-COT and its location. In other cases, proximity may be determined based on a global navigation satellite system (GNSS) location (e.g., a global positioning system (GPS) location provided by a GPS module), and the first UE 115-*g* may use the shared COT only if a distance between the UEs is below the threshold value. In other cases, a serving base station may provide a network supervised sidelink cluster, and the base station may group UEs that can share COTs. For example, the base station may receive higher layer reporting indicating SI-COTs that can be heard by different UEs, and may group UEs based on which UEs are in proximity to each other. In some cases, the base station may assign UEs a group ID for resource reservation in COT sharing, and UEs with a same group ID may use COT sharing for reserved resources.

In other cases, one or more other UEs may detect the third UE 115-*i* COT sharing information and may forward and broadcast COT sharing parameters to other nodes with layer 1 or layer 2 signaling. In such cases, the fourth UE 115-*j* may receive the forwarded COT sharing information and avoid transmitting in the reserved resource of the first UE 115-*g* that are within the shared COT. For example, for layer 1 signaling, a COT detecting receiving node can soft relay the COT sharing information to other nodes in SCI, and provide a transcoded SI-COT bearing SCI that includes the identification of the UE that is sharing its COT. In such cases, the COT sharing region may be offset relative to the slot where the soft relayed SCI is transmitted (e.g., the second UE 115-*h* may forward the third UE 115-*i* COT sharing information to the fourth UE 115-*j* if it has a chance to communicate with the fourth UE 115-*j* before or during the third UE 115-*i* COT sharing region).

Figure 8:
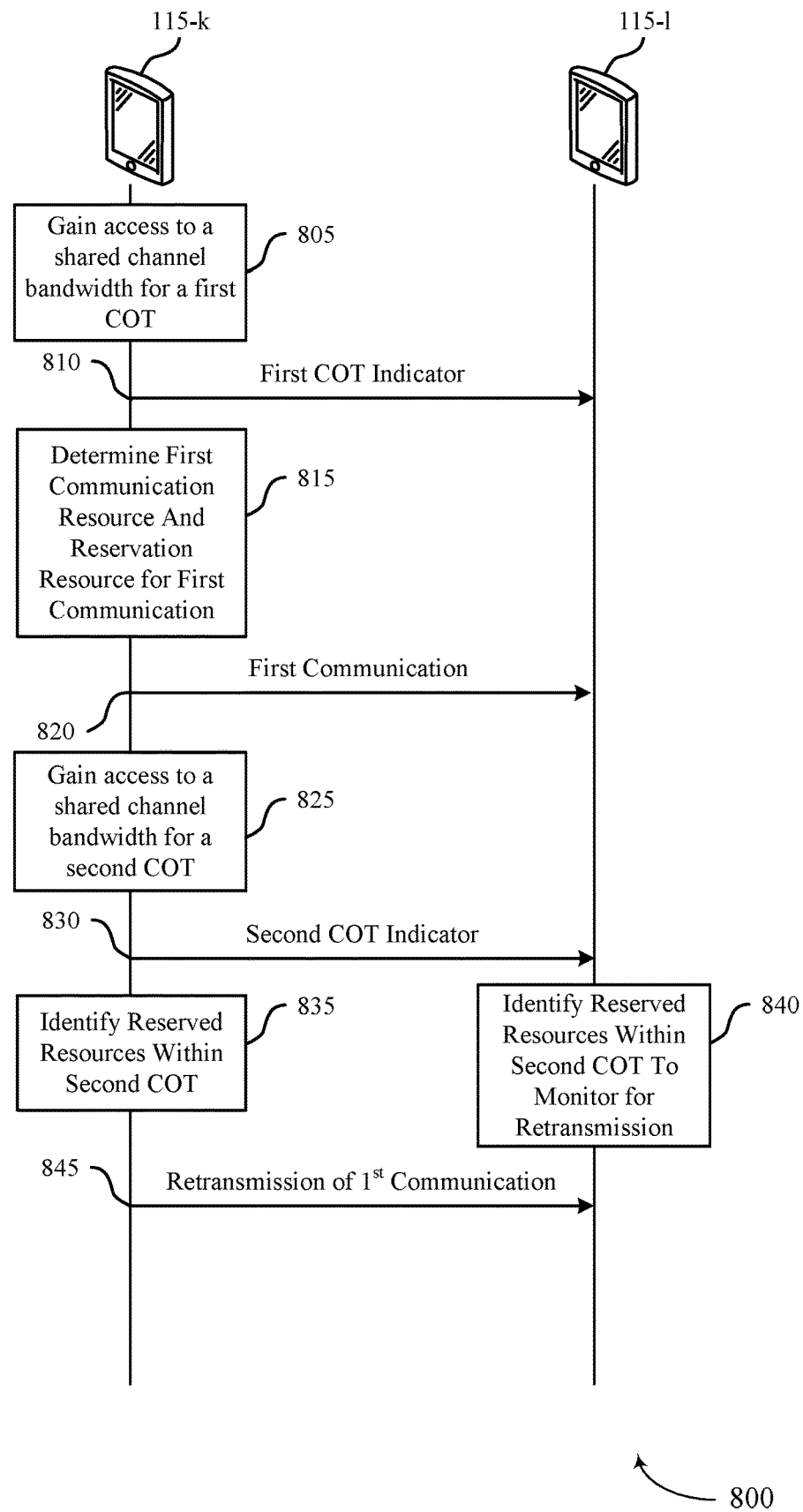
FIGS. 8 and 9 illustrate examples of a process flows that support resource reservation for sidelink communications in shared radio frequency spectrum in accordance with aspects of the present disclosure.

FIG. 8 illustrates an example of a process flow 800 that supports resource reservation for sidelink communications in shared radio frequency spectrum in accordance with aspects of the present disclosure. In some examples, process flow 800 may implement aspects of wireless communications system 100, 200, 600, or 700. Process flow 800 may be implemented by a first UE 115-*k* and a second UE 115-*l*, which may be examples of UEs 115 as described herein. Alternative examples of the following may be implemented, where some steps are performed in a different order than described or are not performed at all. In some cases, steps may include additional features not mentioned below, or further steps may be added.

At 805, the first UE 115-*k* may gain access to a shared channel bandwidth for a first COT. In some cases, the first UE 115-*k* may perform a LBT procedure (e.g., a category 4 LBT) and gain channel access for the first COT. At 810, the first UE 115-*k* may transmit a first COT indicator to the second UE 115-1, and any other UEs that are within a SCI area of the first UE 115-*k*. In some cases, the first COT indicator may provide an indication of the identity of the first UE 115-*k*, may provide an indication of a duration of the first COT, may indicate one or more transmissions and associated reserved resources for retransmissions, or any combinations thereof.

At 815, the first UE 115-*k* may determine a first communication resources for a first communication to the second UE 115-*l* using the shared channel, and reserved resources for one or more repetitions of the first communication. In some cases, the reserved resources may be determined based on a configuration for repetitions of communications (e.g., a number of slots between repetitions, a number of repetitions, one or more offsets relative to a COT timing, or any combinations thereof). At 820, the first UE 115-*k* may transmit the first communication to the second UE 115-1 using the identified resources in the first COT.

At 825, the first UE 115-*k* may gain access to the shared channel bandwidth for a second COT. In some cases, the first UE 115-*k* may again perform a LBT procedure (e.g., a category 4 LBT) and gain channel access for the second COT. At 830, the first UE 115-*k* may transmit a second COT indicator to the second UE 115-1, and any other UEs that are within a SCI area of the first UE 115-*k*.

At 835, the first UE 115-*k* may identify reserved resources within the second COT that are to be used for the one or more retransmissions of the first communication. In some cases, the reserved resources may be identified based on an offset relative to a timing of the second COT, as discussed herein. At 840, the second UE 115-*l* may also identify the reserved resources within the second COT and monitor the identified resources for the one or more retransmissions of the first communication. At 845, the first UE 115-*k* may transmit the one or more retransmissions of the first communication.

Figure 9:
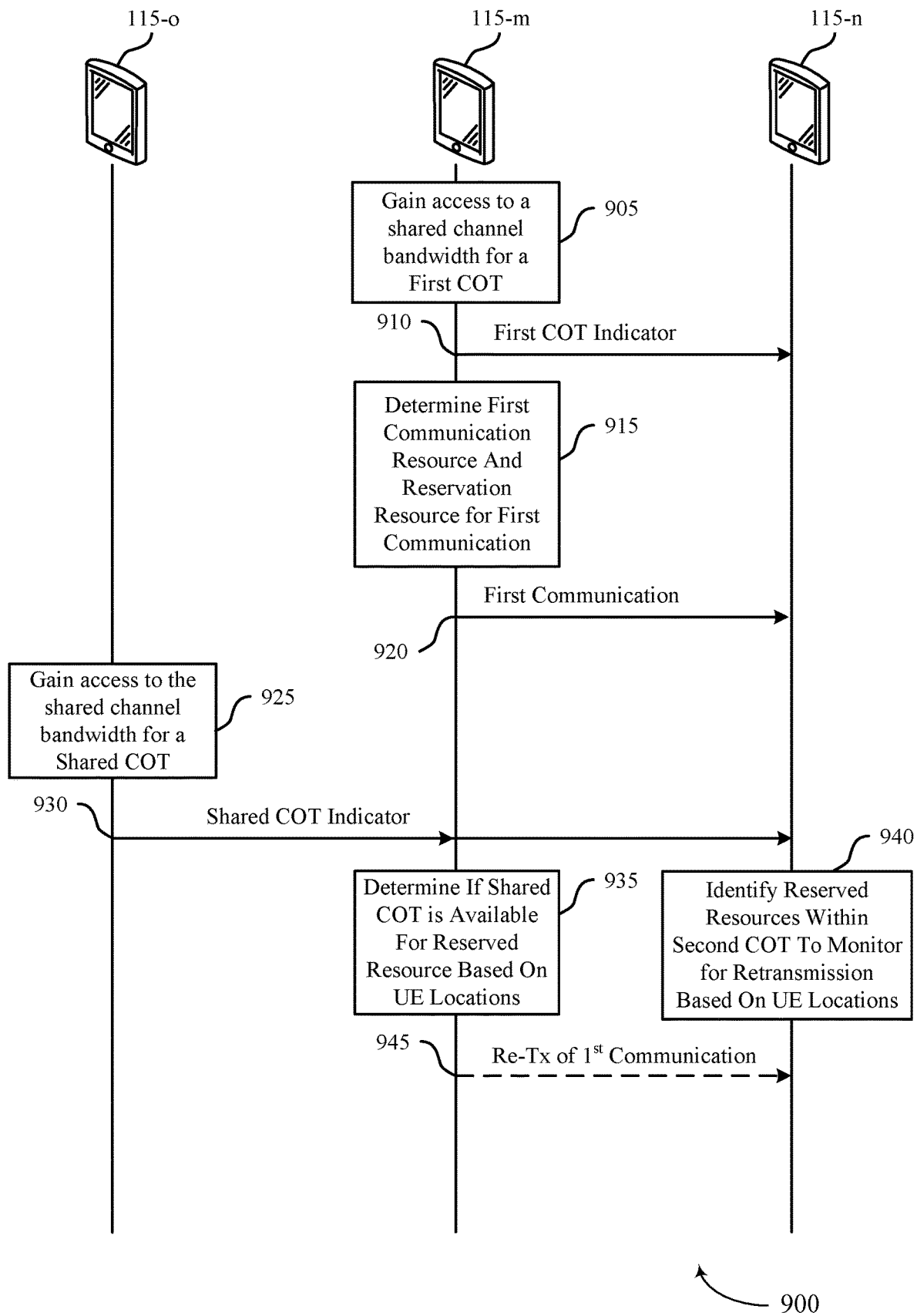

FIG. 9 illustrates an example of a process flow 900 that supports resource reservation for sidelink communications in shared radio frequency spectrum in accordance with aspects of the present disclosure. In some examples, process flow 900 may implement aspects of wireless communications system 100, 200, 600, or 700. Process flow 900 may be implemented by a first UE 115-*m*, a second UE 115-*n*, and a third UE 115-*o*, which may be examples of UEs 115 as described herein. Alternative examples of the following may be implemented, where some steps are performed in a different order than described or are not performed at all. In some cases, steps may include additional features not mentioned below, or further steps may be added.

At 905, the first UE 115-*m* may gain access to a shared channel bandwidth for a first COT. In some cases, the first UE 115-*m* may perform a LBT procedure (e.g., a category 4 LBT) and gain channel access for the first COT. At 910, the first UE 115-*m* may transmit a first COT indicator to the second UE 115-*n* (which may also be received at the third UE 115-*o* and one or more other UEs that are within a SCI area of the first UE 115-*m*). In some cases, the first COT indicator may provide an indication of the identity of the first UE 115-*m*, may provide an indication of a duration of the first COT, may indicate one or more transmissions and associated reserved resources for retransmissions, or any combinations thereof.

At 915, the first UE 115-*m* may determine a first communication resources for a first communication to the second UE 115-*n* using the shared channel, and reserved resources for one or more repetitions of the first communication. In some cases, the reserved resources may be determined based on a configuration for repetitions of communications (e.g., a number of slots between repetitions, a number of repetitions, one or more offsets relative to a COT timing, or any combinations thereof). At 920, the first UE 115-*m* may transmit the first communication to the second UE 115-*n* using the identified resources in the first COT.

At 925, the third UE 115-*o* may gain access to the shared channel bandwidth for a shared COT. In some cases, the third UE 115-*o* may perform a LBT procedure (e.g., a category 4 LBT) and gain channel access for the shared COT. At 930, the third UE 115-*o* may transmit a shared COT indicator to the first UE 115-*m* and the second UE 115-*n* (and one or more other UEs that are within a SCI area of the third UE 115-*o*). In some cases, the shared COT indicator may provide an indication of the identity of the third UE 115-*o*, and may provide an indication of a duration of a shared portion of the shared COT.

At 935, the first UE 115-*m* may determine if the shared COT is available for reserved resources of the first UE 115-*m* for retransmission of the first communication. In some cases, such a determination may be made based on a proximity between the first UE 115-*m* and the third UE 115-*o*, various examples of which are discussed herein. At 940, the second UE 115-*n* may also identify reserved resources within the shared COT that are to be monitored for retransmissions based on the UE locations. At 945, if it is determined that the shared COT is available for retransmissions on the reserved resources, the first UE 115-*m* may transmit a retransmission of the first communication.

Figure 10:
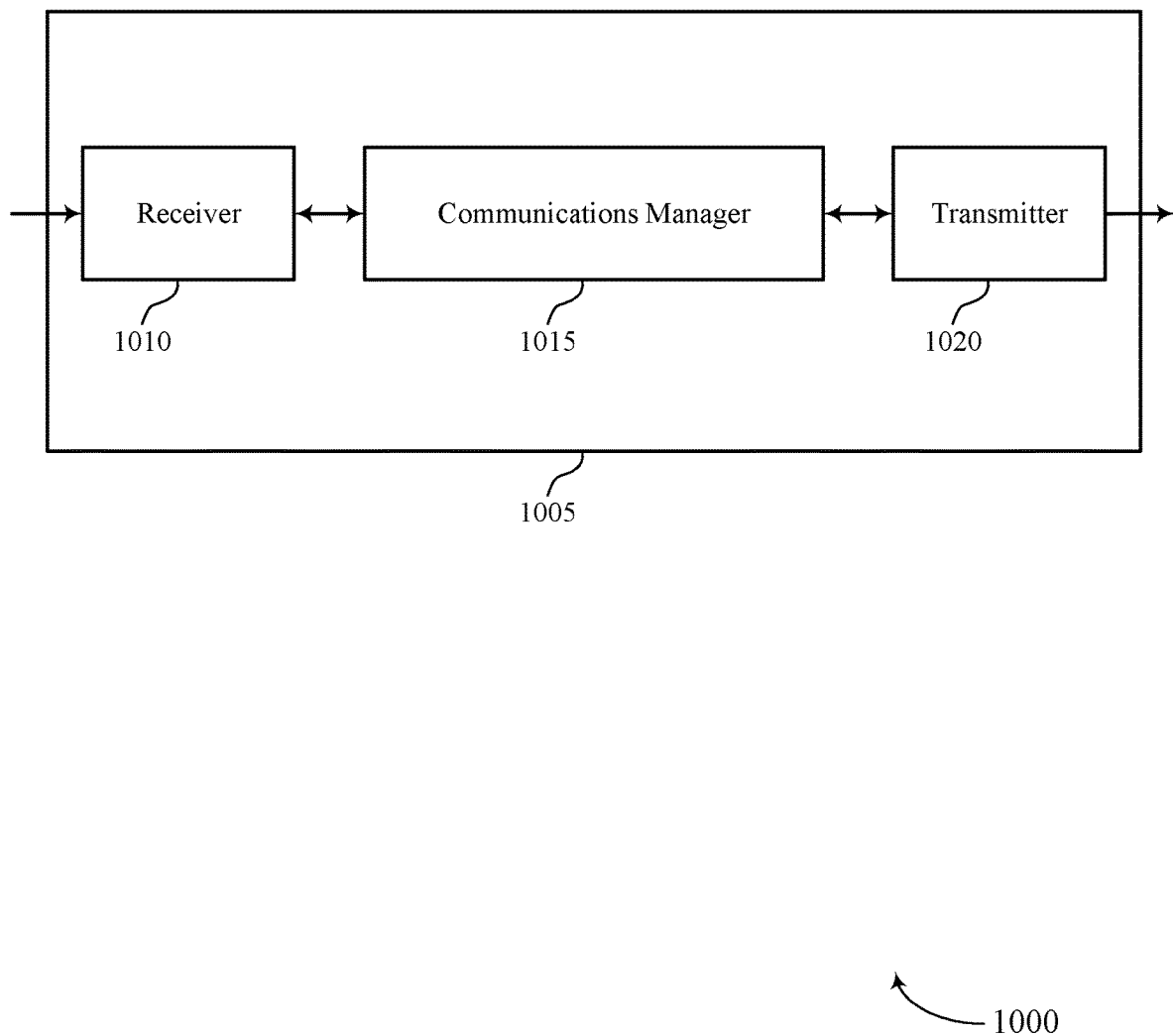
FIGS. 10 and 11 show block diagrams of devices that support resource reservation for sidelink communications in shared radio frequency spectrum in accordance with aspects of the present disclosure.

FIG. 10 shows a block diagram 1000 of a device 1005 that supports resource reservation for sidelink communications in shared radio frequency spectrum in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to resource reservation for sidelink communications in shared radio frequency spectrum, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a first communication to at least a second UE during a first COT of the first UE for sidelink communications in a shared radio frequency spectrum band, reserve at least a first resource for a retransmission of the first communication in a second COT for sidelink communications in the shared radio frequency spectrum band, where the first resource is indicated relative to a start time of the second COT, determine, after the reserving, the start time of the second COT in the shared radio frequency spectrum band, identify a timing for the first resource based on the determined start time of the second COT, and retransmit the first communication to at least the second UE using the first resource.

The communications manager 1015 may also receive, from a first UE, a first communication during a first COT for sidelink communications in a shared radio frequency spectrum band, receive, from the first UE, an indication of at least a first reserved resource for a retransmission of the first communication in a second COT for sidelink communications in the shared radio frequency spectrum band, where the first reserved resource is indicated relative to a start time of the second COT, determine, after the first COT, the start time of the second COT in the shared radio frequency spectrum band, and identify a timing for the first reserved resource based on the determined start time of the second COT. The communications manager 1015 may be an example of aspects of the communications manager 1310 described herein.

The communications manager 1015 as described herein may be implemented to realize one or more potential advantages. One implementation may allow the device 1005 to reliably determine reserved resources for one or more retransmissions for one or more sidelink communications. Such operations may provide improvements to reliability and efficiency in communications with sidelink UEs and with other UEs that may transmit or receive high priority or low latency communications using shared radio frequency spectrum or that otherwise gain channel access through a contention-based channel access procedure. Such improvements may enhance efficiency of wireless communications at a UE by allowing for reliable identification of reserved resources in the sidelink resources. As such, supported techniques may include improved network and UE operations and, in some examples, may promote network efficiencies, reduce latency, and provide network scheduling flexibility, among other benefits.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
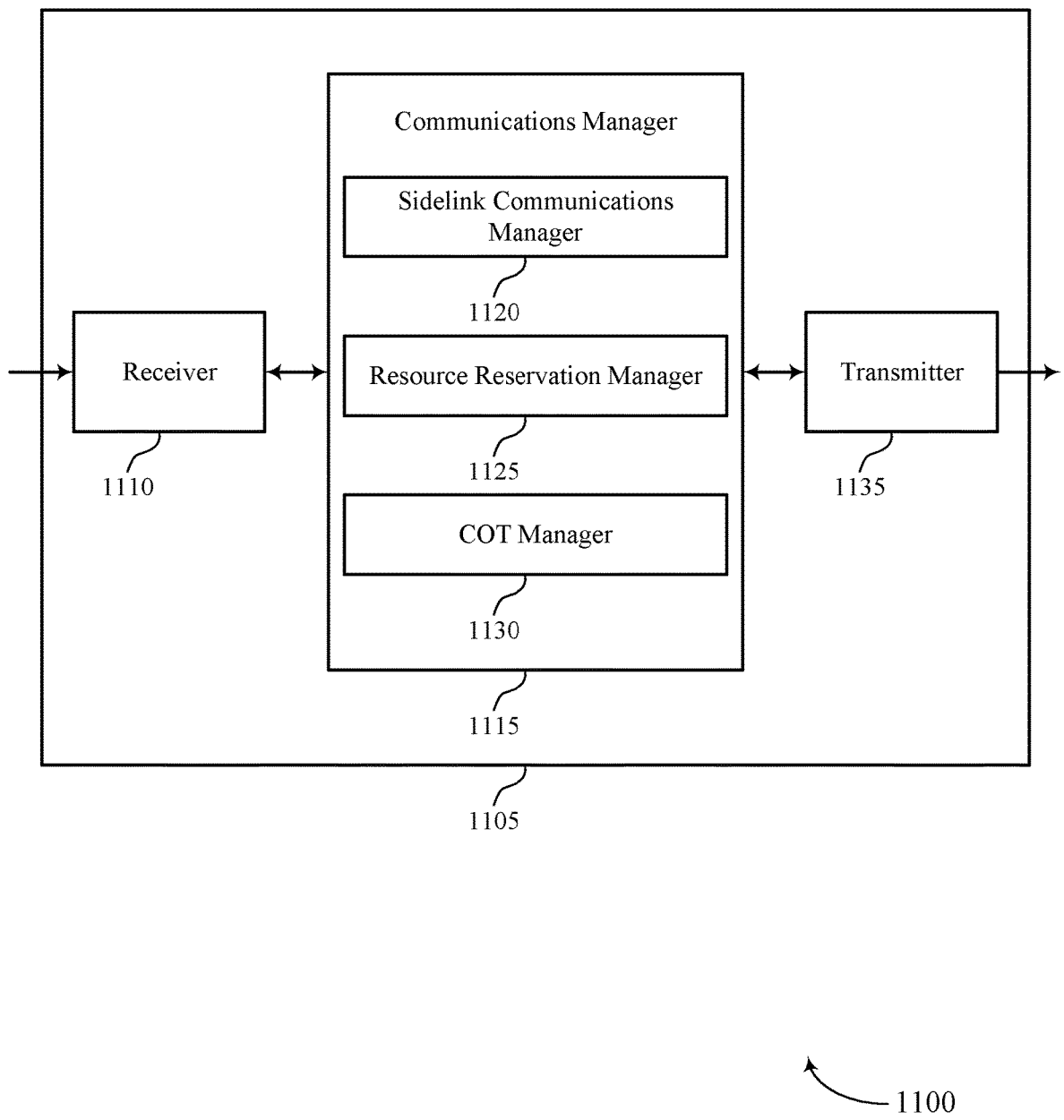

FIG. 11 shows a block diagram 1100 of a device 1105 that supports resource reservation for sidelink communications in shared radio frequency spectrum in accordance with aspects of the present disclosure. The device 1105 may be an example of aspects of a device 1005, or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to resource reservation for sidelink communications in shared radio frequency spectrum, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a sidelink communications manager 1120, a resource reservation manager 1125, and a COT manager 1130. The communications manager 1115 may be an example of aspects of the communications manager 1310 described herein.

In some cases, the sidelink communications manager 1120 may transmit a first communication to at least a second UE during a first COT of the first UE for sidelink communications in a shared radio frequency spectrum band. The resource reservation manager 1125 may reserve at least a first resource for a retransmission of the first communication in a second COT for sidelink communications in the shared radio frequency spectrum band, where the first resource is indicated relative to a start time of the second COT. The COT manager 1130 may determine, after the reserving, the start time of the second COT in the shared radio frequency spectrum band. The resource reservation manager 1125 may identify a timing for the first resource based on the determined start time of the second COT. The sidelink communications manager 1120 may retransmit the first communication to at least the second UE using the first resource.

In some cases, the sidelink communications manager 1120 may receive, from a first UE, a first communication during a first COT for sidelink communications in a shared radio frequency spectrum band. The resource reservation manager 1125 may receive, from the first UE, an indication of at least a first reserved resource for a retransmission of the first communication in a second COT for sidelink communications in the shared radio frequency spectrum band, where the first reserved resource is indicated relative to a start time of the second COT. The COT manager 1130 may determine, after the first COT, the start time of the second COT in the shared radio frequency spectrum band. The resource reservation manager 1125 may identify a timing for the first reserved resource based on the determined start time of the second COT.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
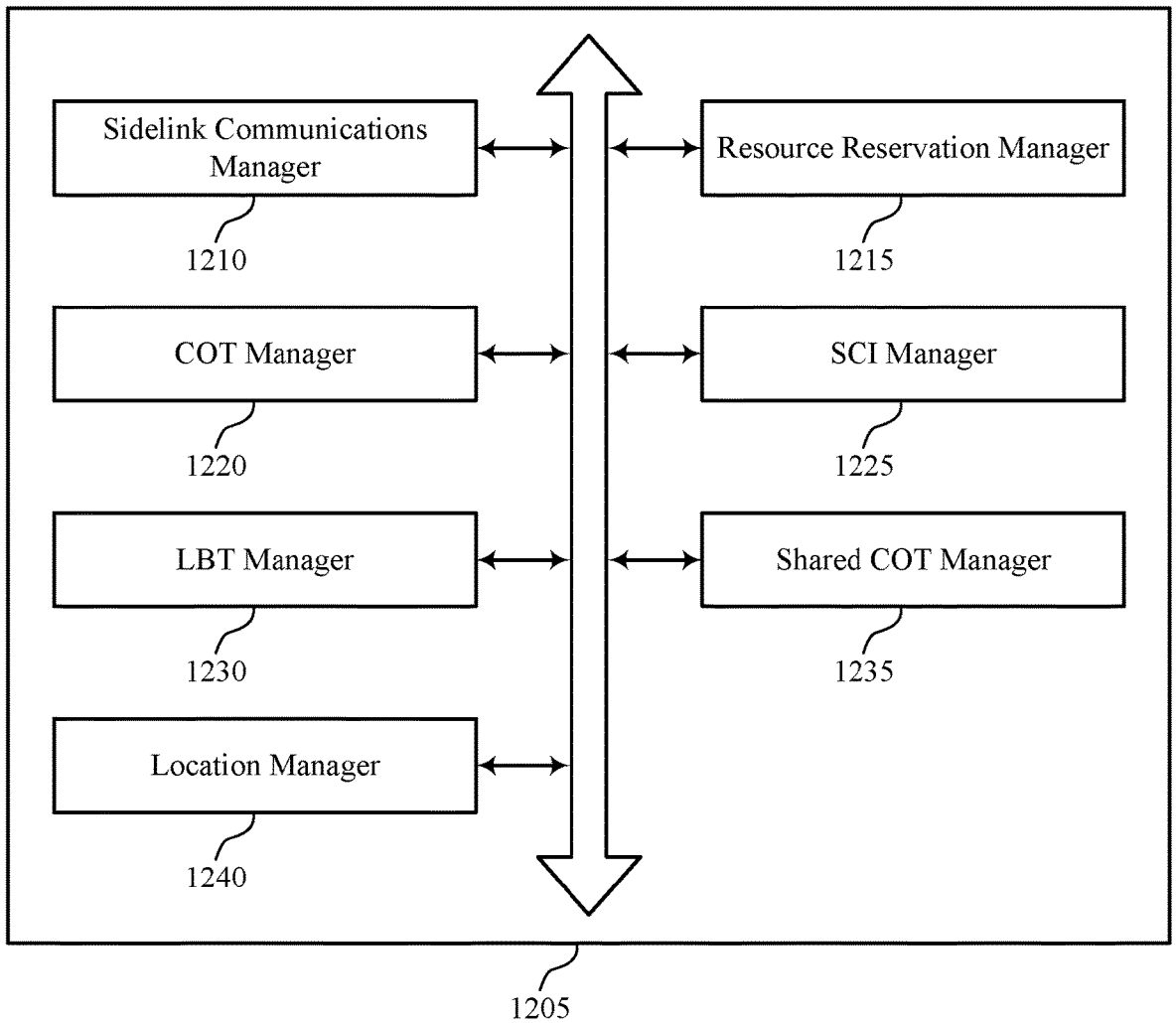
FIG. 12 shows a block diagram of a communications manager that supports resource reservation for sidelink communications in shared radio frequency spectrum in accordance with aspects of the present disclosure.

FIG. 12 shows a block diagram 1200 of a communications manager 1205 that supports resource reservation for sidelink communications in shared radio frequency spectrum in accordance with aspects of the present disclosure. The communications manager 1205 may be an example of aspects of a communications manager 1015, a communications manager 1115, or a communications manager 1310 described herein. The communications manager 1205 may include a sidelink communications manager 1210, a resource reservation manager 1215, a COT manager 1220, a SCI manager 1225, a LBT manager 1230, a shared COT manager 1235, and a location manager 1240. Each of these modules may communicate, directly or indirectly, with one another (e.g., via one or more buses).

The sidelink communications manager 1210 of a first UE may transmit a first communication to at least a second UE during a first COT of the first UE for sidelink communications in a shared radio frequency spectrum band. In some examples, the sidelink communications manager 1210 may retransmit the first communication to at least the second UE using the first resource that is a reserved resource for retransmissions.

In some examples, the sidelink communications manager 1210 of a second UE may receive, from a first UE, a first communication during a first COT for sidelink communications in a shared radio frequency spectrum band. In some examples, the sidelink communications manager 1210 may monitor for the retransmission of the first communication based on the indication that the first resource is used for the retransmission of the first communication.

The resource reservation manager 1215 of the first UE may reserve at least a first resource for a retransmission of the first communication in a second COT for sidelink communications in the shared radio frequency spectrum band, where the first resource is indicated relative to a start time of the second COT. In some examples, the resource reservation manager 1215 may identify a timing for the first resource based on the determined start time of the second COT.

In some examples, the resource reservation manager 1215 at the second UE may receive, from the first UE, an indication of at least a first reserved resource for a retransmission of the first communication in a second COT for sidelink communications in the shared radio frequency spectrum band, where the first reserved resource is indicated relative to a start time of the second COT. In some examples, the resource reservation manager 1215 may identify a timing for the first reserved resource based on the determined start time of the second COT.

In some examples, the resource reservation manager 1215 of the first UE may transmit, to one or more other UEs, an indication of a relative slot offset between the start time of the second COT and the first resource. In some cases, the indication of the relative slot offset between the start time of the second COT and the first resource is indicated in a SCI transmission.

In some cases, the first resource expires based on a predetermined window after the first communication. In some cases, the predetermined window corresponds to a predetermined number of COTs after the first communication, a predetermined time period after the first communication, or any combinations thereof. In some cases, the reserving of at least the first resource includes reserving periodic resources and the predetermined window applies to each period of the periodic resources. In some cases, the indication of at least the first reserved resource includes a relative slot offset between the start time of the second COT and the first reserved resource.

The COT manager 1220 may determine, after the reserving, the start time of the second COT in the shared radio frequency spectrum band.

The SCI manager 1225 may transmit, to one or more other UEs, SCI that indicates one or more of the first COT or the second COT. In some examples, the SCI manager 1225 may transmit, within the first COT, two or more instances of the SCI, where each instance of the SCI indicates the first COT. In some examples, the SCI manager 1225 may transmit, during the second COT, an indication that the first resource is used or unused for retransmission of the first communication. In some examples, the SCI manager 1225 of the second UE may receive, from the first UE, SCI that indicates one or more of the first COT, the second COT, the indication of the first reserved resource, or any combinations thereof.

In some cases, each instance of the SCI indicates an offset between the instance of the SCI and a start of the first COT. In some cases, the indication is provided in SCI that is transmitted during the second COT. In some cases, the SCI includes a bitmap that provides the indication, where each bit of the bitmap corresponds to a reserved resource in the second COT. In some cases, the first UE transmits two or more instances of the SCI, where each instance of the SCI indicates the first COT and an offset between the instance of the SCI and a start of a COT associated with the SCI.

The LBT manager 1230 may determine that a LBT procedure associated with the second COT has obtained the shared radio frequency spectrum band for the sidelink communications. In some examples, the LBT manager 1230 may determine the start time of the second COT based on a completion time of the LBT procedure.

The shared COT manager 1235 may receive, from the third UE, SCI that identifies the second COT and a shared COT for the sidelink communications in the shared radio frequency spectrum band. In some cases, the second COT is obtained by a third UE for sidelink communications in the shared radio frequency spectrum band. In some cases, the timing of the first resource is based on the SCI from the third UE. In some cases, the first resource is indicated by a slot offset to a COT that is obtained by a different UE. In some cases, the first resource is indicated by a slot offset to a boundary of the second COT that is obtained by the third UE. In some cases, the first resource is indicated by a slot offset from a start of the shared COT that is indicated by the third UE. In some cases, the SCI from the third UE indicates a duration of the shared COT, and where the timing of the first resource is determined based on the duration of the shared COT.

The location manager 1240 may receive, from a third UE, SCI that indicates a shared COT and a zone identification. In some examples, the location manager 1240 may determine whether the shared COT is available as the second COT based on the zone identification. In some examples, the location manager 1240 may determine that a distance between the first UE and a location associated with the zone identification is less than a threshold value, and where the shared COT is available as the second COT based on the distance being less than the threshold value. In some examples, the location manager 1240 may determine, based on a GNSS, a first location of the first UE, and where the determining that the distance is less than the threshold value is based on the first location and the location associated with the zone identification.

In some examples, the location manager 1240 may receive, from a third UE, SCI that indicates a shared COT and a zone identification. In some examples, the location manager 1240 may determine whether the shared COT is available as the second COT based on the zone identification. In some cases, the location associated with the zone identification is a location of the third UE. In some cases, the zone identification corresponds to a group identification provided by a network node, and where the shared COT is available as the second COT when the group identification of the first UE is the same as the group identification of the third UE.

In some cases, the SCI from the third UE is forwarded by one or more other UEs. In some cases, the one or more other UEs act as relay nodes for the SCI and include a UE identification of the third UE that obtained the second COT.

In some cases, the zone identification corresponds to a group identification provided by a network node, and where the shared COT is available as the second COT when the group identification of the first UE is the same as the group identification of the third UE. In some cases, the SCI from the third UE is forwarded by one or more other UEs.

Figure 13:
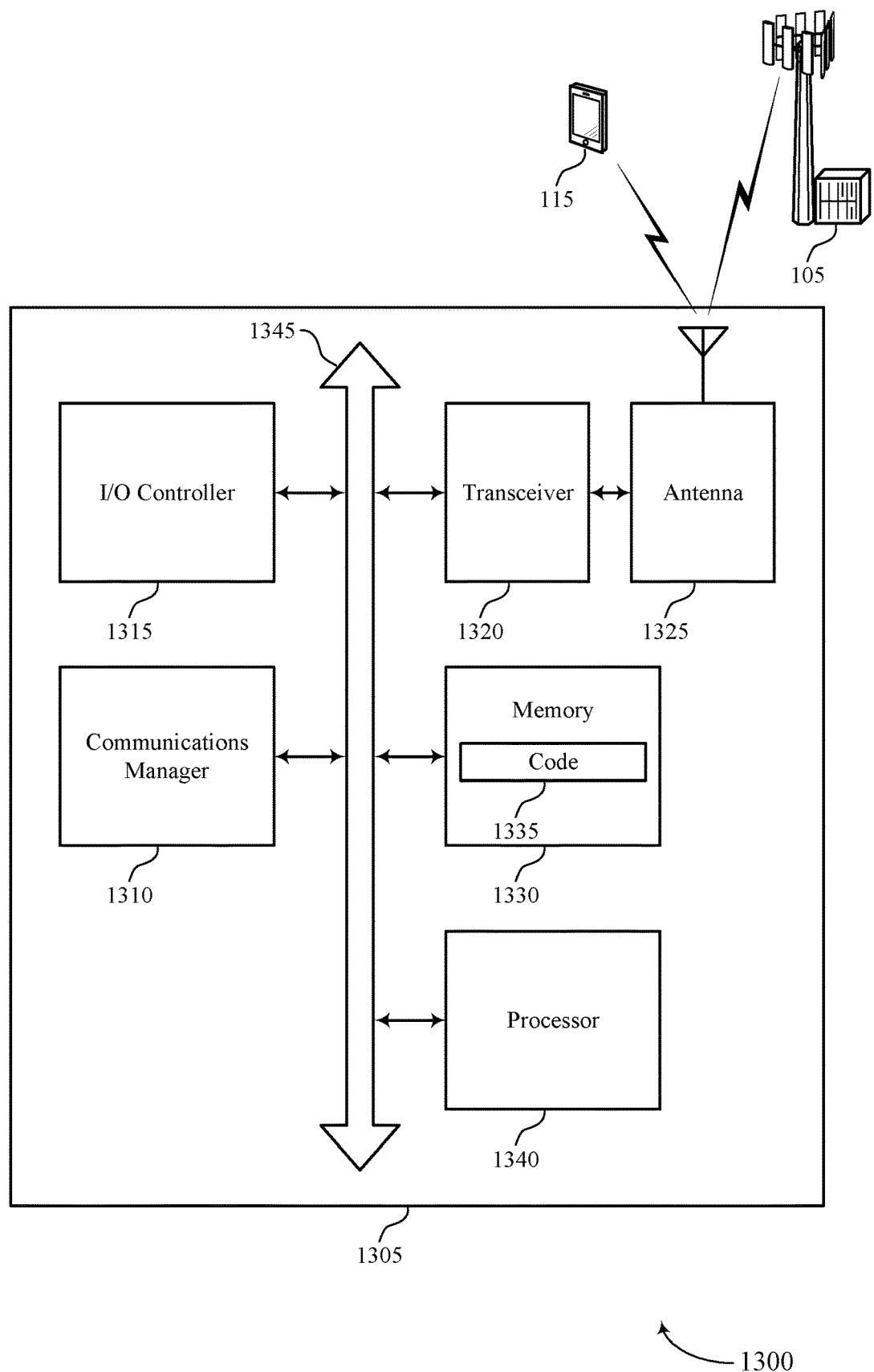
FIG. 13 shows a diagram of a system including a device that supports resource reservation for sidelink communications in shared radio frequency spectrum in accordance with aspects of the present disclosure.

FIG. 13 shows a diagram of a system 1300 including a device 1305 that supports resource reservation for sidelink communications in shared radio frequency spectrum in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may transmit a first communication to at least a second UE during a first COT of the first UE for sidelink communications in a shared radio frequency spectrum band, reserve at least a first resource for a retransmission of the first communication in a second COT for sidelink communications in the shared radio frequency spectrum band, where the first resource is indicated relative to a start time of the second COT, determine, after the reserving, the start time of the second COT in the shared radio frequency spectrum band, identify a timing for the first resource based on the determined start time of the second COT, and retransmit the first communication to at least the second UE using the first resource.

The communications manager 1310 may also receive, from a first UE, a first communication during a first COT for sidelink communications in a shared radio frequency spectrum band, receive, from the first UE, an indication of at least a first reserved resource for a retransmission of the first communication in a second COT for sidelink communications in the shared radio frequency spectrum band, where the first reserved resource is indicated relative to a start time of the second COT, determine, after the first COT, the start time of the second COT in the shared radio frequency spectrum band, and identify a timing for the first reserved resource based on the determined start time of the second COT.

The communications manager 1315 as described herein may be implemented to realize one or more potential advantages. One implementation may allow the device 1305 to reliably determine reserved resources for one or more retransmissions for one or more sidelink communications. Such operations may provide improvements to reliability and efficiency in communications with sidelink UEs and with other UEs that may transmit or receive high priority or low latency communications using shared radio frequency spectrum or that otherwise gain channel access through a contention-based channel access procedure.

Such improvements may enhance efficiency of wireless communications at a UE by allowing for reliable identification of reserved resources in the sidelink resources. As such, supported techniques may include improved network and UE operations and, in some examples, may promote network efficiencies, reduce latency, and provide network scheduling flexibility, among other benefits.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting resource reservation for sidelink communications in shared radio frequency spectrum).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
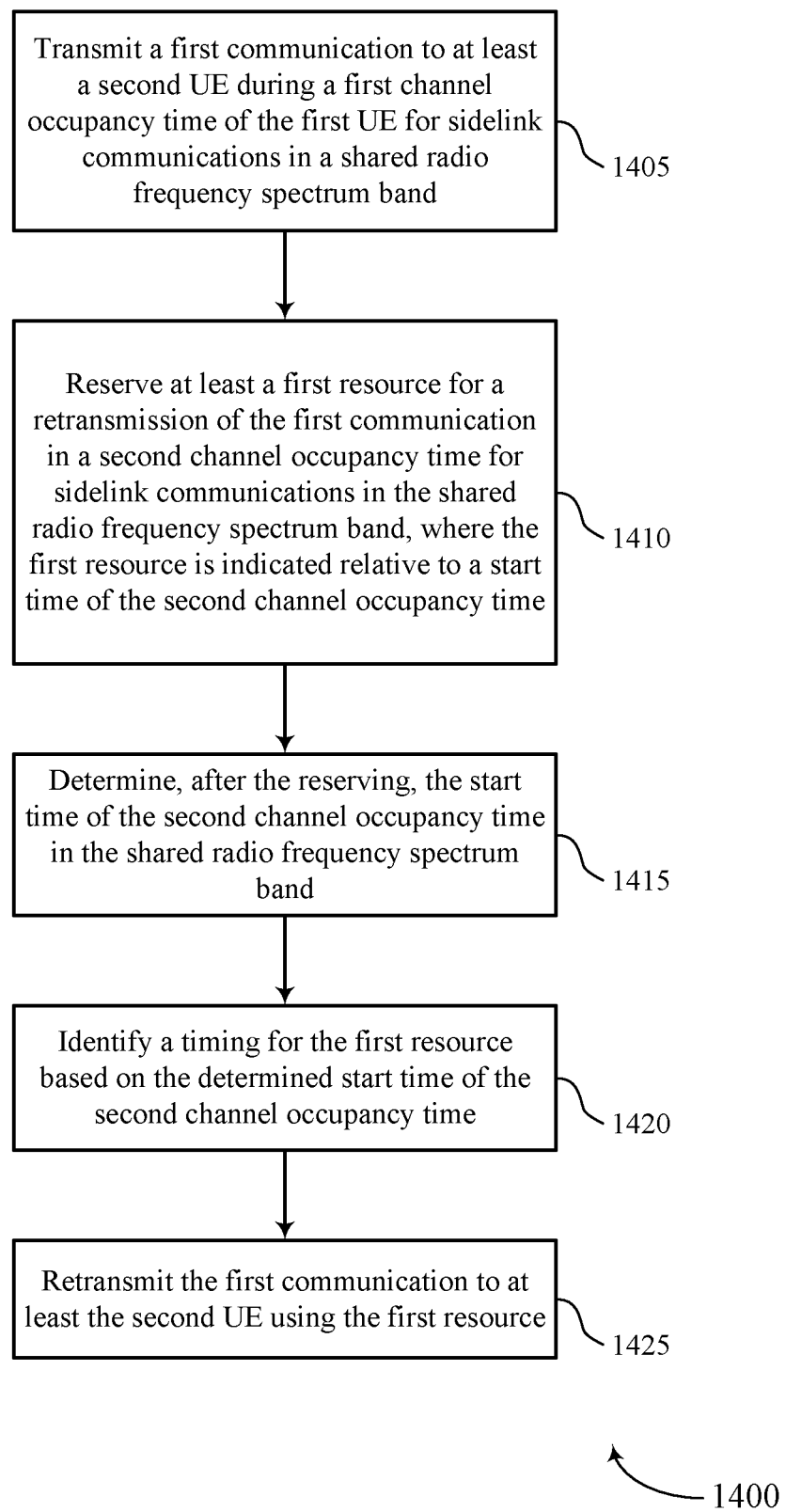
FIGS. 14 through 22 show flowcharts illustrating methods that support resource reservation for sidelink communications in shared radio frequency spectrum in accordance with aspects of the present disclosure.

FIG. 14 shows a flowchart illustrating a method 1400 that supports resource reservation for sidelink communications in shared radio frequency spectrum in accordance with aspects of the present disclosure. The operations of method 1400 may be implemented by a UE 115 or its components as described herein. For example, the operations of method 1400 may be performed by a communications manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 1405, the UE may transmit a first communication to at least a second UE during a first COT of the first UE for sidelink communications in a shared radio frequency spectrum band. The operations of 1405 may be performed according to the methods described herein. In some examples, aspects of the operations of 1405 may be performed by a sidelink communications manager as described with reference to FIGS. 10 through 13.

At 1410, the UE may reserve at least a first resource for a retransmission of the first communication in a second COT for sidelink communications in the shared radio frequency spectrum band, where the first resource is indicated relative to a start time of the second COT. The operations of 1410 may be performed according to the methods described herein. In some examples, aspects of the operations of 1410 may be performed by a resource reservation manager as described with reference to FIGS. 10 through 13.

At 1415, the UE may determine, after the reserving, the start time of the second COT in the shared radio frequency spectrum band. The operations of 1415 may be performed according to the methods described herein. In some examples, aspects of the operations of 1415 may be performed by a COT manager as described with reference to FIGS. 10 through 13.

At 1420, the UE may identify a timing for the first resource based on the determined start time of the second COT. The operations of 1420 may be performed according to the methods described herein. In some examples, aspects of the operations of 1420 may be performed by a resource reservation manager as described with reference to FIGS. 10 through 13.

At 1425, the UE may retransmit the first communication to at least the second UE using the first resource. The operations of 1425 may be performed according to the methods described herein. In some examples, aspects of the operations of 1425 may be performed by a sidelink communications manager as described with reference to FIGS. 10 through 13.

Figure 15:
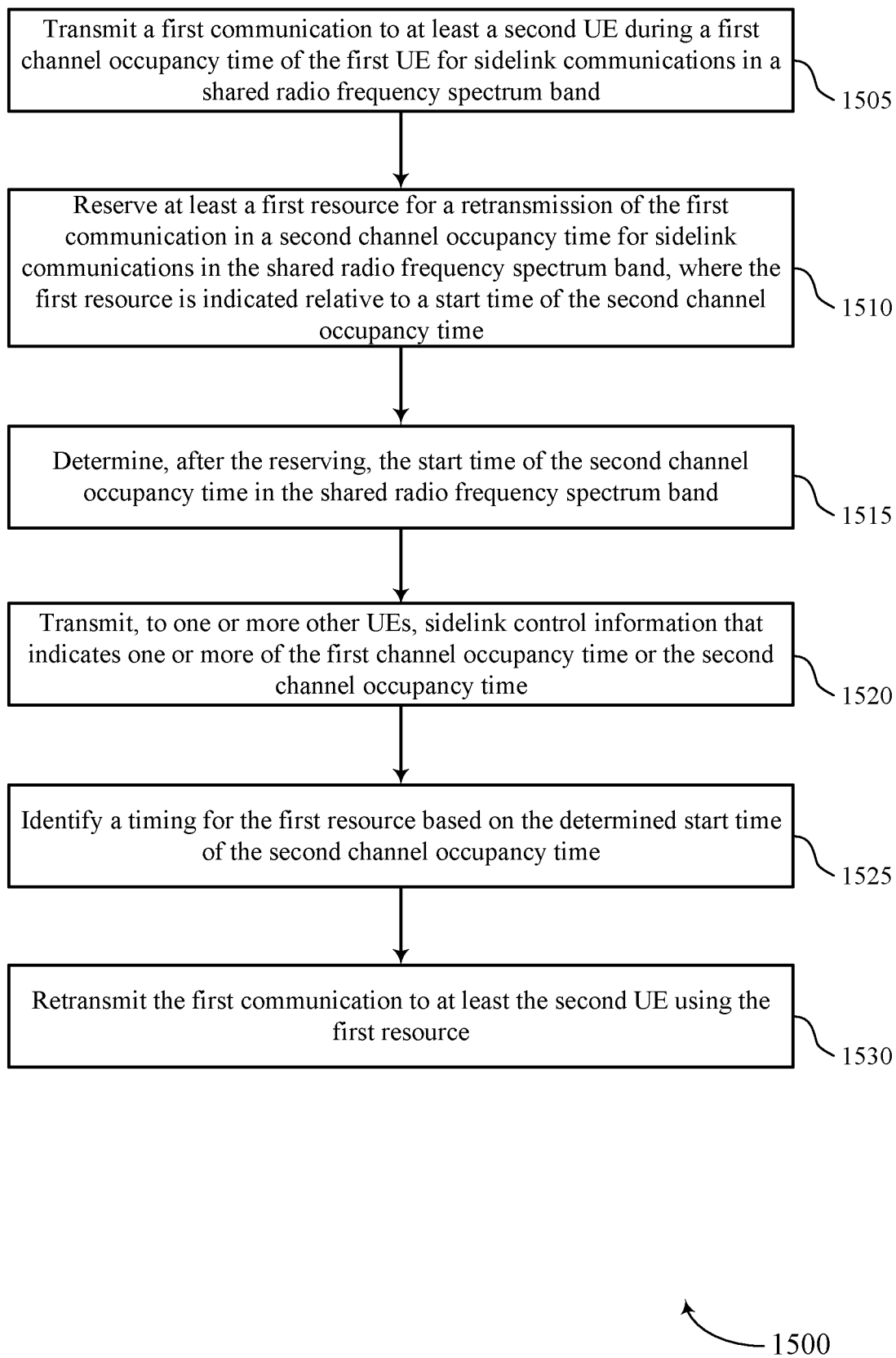

FIG. 15 shows a flowchart illustrating a method 1500 that supports resource reservation for sidelink communications in shared radio frequency spectrum in accordance with aspects of the present disclosure. The operations of method 1500 may be implemented by a UE 115 or its components as described herein. For example, the operations of method 1500 may be performed by a communications manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 1505, the UE may transmit a first communication to at least a second UE during a first COT of the first UE for sidelink communications in a shared radio frequency spectrum band. The operations of 1505 may be performed according to the methods described herein. In some examples, aspects of the operations of 1505 may be performed by a sidelink communications manager as described with reference to FIGS. 10 through 13. In some cases, the UE may transmit, within the first COT, two or more instances of the SCI, where each instance of the SCI indicates the first COT. In some cases, each instance of the SCI indicates an offset between the instance of the SCI and a start of the first COT.

At 1510, the UE may reserve at least a first resource for a retransmission of the first communication in a second COT for sidelink communications in the shared radio frequency spectrum band, where the first resource is indicated relative to a start time of the second COT. The operations of 1510 may be performed according to the methods described herein. In some examples, aspects of the operations of 1510 may be performed by a resource reservation manager as described with reference to FIGS. 10 through 13.

At 1515, the UE may determine, after the reserving, the start time of the second COT in the shared radio frequency spectrum band. The operations of 1515 may be performed according to the methods described herein. In some examples, aspects of the operations of 1515 may be performed by a COT manager as described with reference to FIGS. 10 through 13.

At 1520, the UE may transmit, to one or more other UEs, SCI that indicates one or more of the first COT or the second COT. The operations of 1520 may be performed according to the methods described herein. In some examples, aspects of the operations of 1520 may be performed by a SCI manager as described with reference to FIGS. 10 through 13.

At 1525, the UE may identify a timing for the first resource based on the determined start time of the second COT. The operations of 1525 may be performed according to the methods described herein. In some examples, aspects of the operations of 1525 may be performed by a resource reservation manager as described with reference to FIGS. 10 through 13.

At 1530, the UE may retransmit the first communication to at least the second UE using the first resource. The operations of 1530 may be performed according to the methods described herein. In some examples, aspects of the operations of 1530 may be performed by a sidelink communications manager as described with reference to FIGS. 10 through 13.

Figure 16:
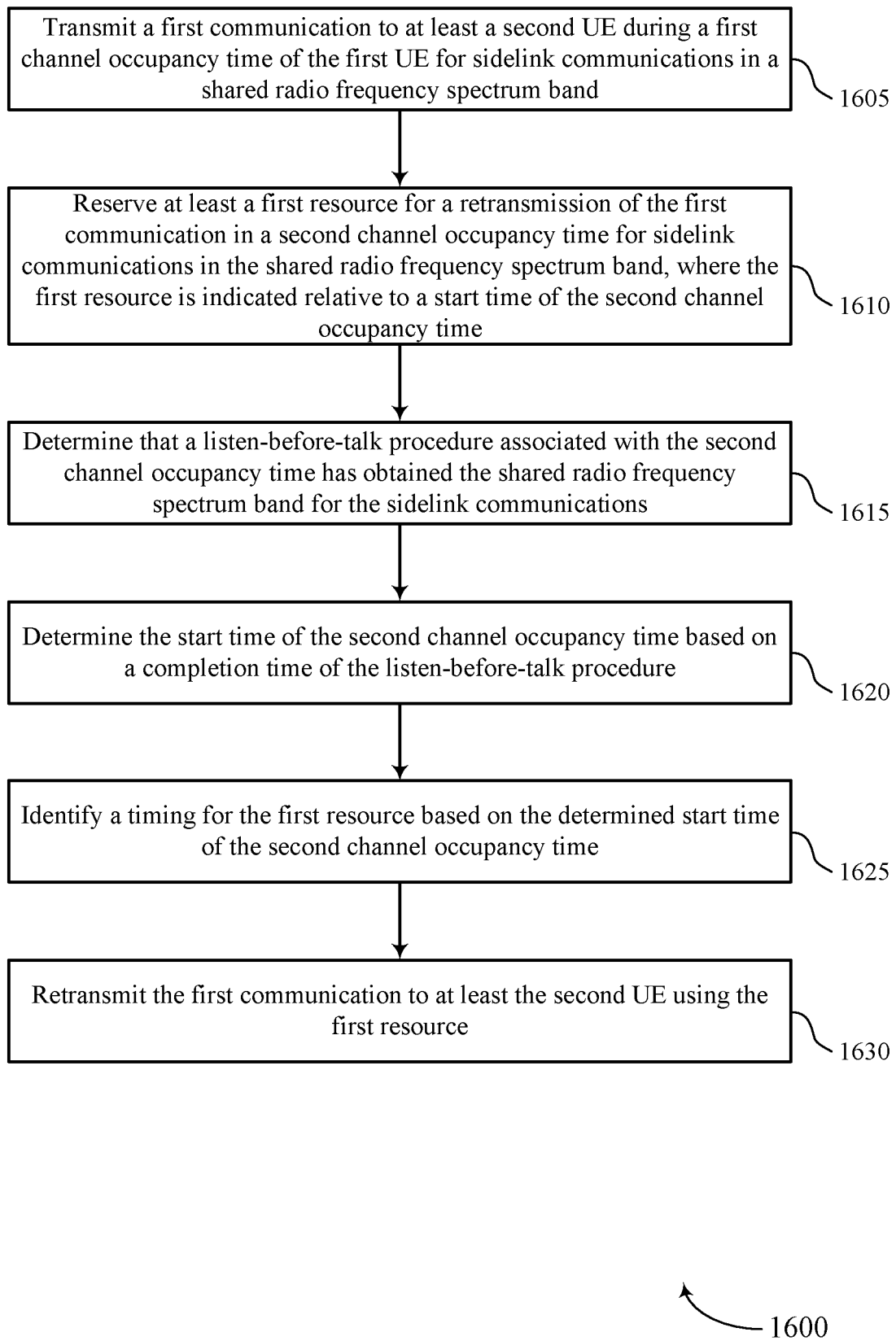

FIG. 16 shows a flowchart illustrating a method 1600 that supports resource reservation for sidelink communications in shared radio frequency spectrum in accordance with aspects of the present disclosure. The operations of method 1600 may be implemented by a UE 115 or its components as described herein. For example, the operations of method 1600 may be performed by a communications manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 1605, the UE may transmit a first communication to at least a second UE during a first COT of the first UE for sidelink communications in a shared radio frequency spectrum band. The operations of 1605 may be performed according to the methods described herein. In some examples, aspects of the operations of 1605 may be performed by a sidelink communications manager as described with reference to FIGS. 10 through 13.

At 1610, the UE may reserve at least a first resource for a retransmission of the first communication in a second COT for sidelink communications in the shared radio frequency spectrum band, where the first resource is indicated relative to a start time of the second COT. The operations of 1610 may be performed according to the methods described herein. In some examples, aspects of the operations of 1610 may be performed by a resource reservation manager as described with reference to FIGS. 10 through 13.

At 1615, the UE may determine that a listen-before-talk procedure associated with the second COT has obtained the shared radio frequency spectrum band for the sidelink communications. The operations of 1615 may be performed according to the methods described herein. In some examples, aspects of the operations of 1615 may be performed by a LBT manager as described with reference to FIGS. 10 through 13.

At 1620, the UE may determine the start time of the second COT based on a completion time of the listen-before-talk procedure. The operations of 1620 may be performed according to the methods described herein. In some examples, aspects of the operations of 1620 may be performed by a LBT manager as described with reference to FIGS. 10 through 13.

At 1625, the UE may identify a timing for the first resource based on the determined start time of the second COT. The operations of 1625 may be performed according to the methods described herein. In some examples, aspects of the operations of 1625 may be performed by a resource reservation manager as described with reference to FIGS. 10 through 13.

At 1630, the UE may retransmit the first communication to at least the second UE using the first resource. The operations of 1630 may be performed according to the methods described herein. In some examples, aspects of the operations of 1630 may be performed by a sidelink communications manager as described with reference to FIGS. 10 through 13.

Figure 17:
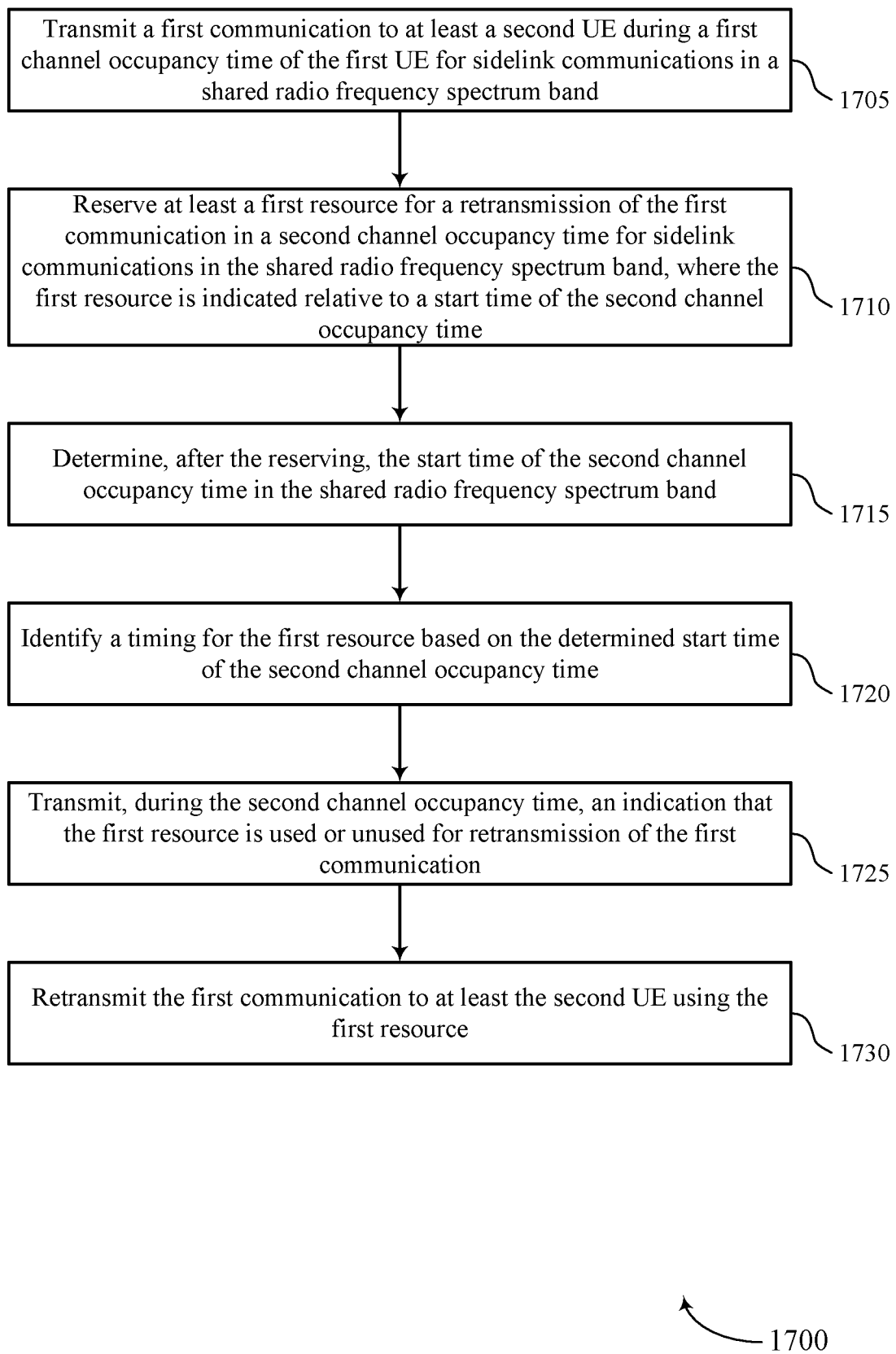

FIG. 17 shows a flowchart illustrating a method 1700 that supports resource reservation for sidelink communications in shared radio frequency spectrum in accordance with aspects of the present disclosure. The operations of method 1700 may be implemented by a UE 115 or its components as described herein. For example, the operations of method 1700 may be performed by a communications manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 1705, the UE may transmit a first communication to at least a second UE during a first COT of the first UE for sidelink communications in a shared radio frequency spectrum band. The operations of 1705 may be performed according to the methods described herein. In some examples, aspects of the operations of 1705 may be performed by a sidelink communications manager as described with reference to FIGS. 10 through 13.

At 1710, the UE may reserve at least a first resource for a retransmission of the first communication in a second COT for sidelink communications in the shared radio frequency spectrum band, where the first resource is indicated relative to a start time of the second COT. The operations of 1710 may be performed according to the methods described herein. In some examples, aspects of the operations of 1710 may be performed by a resource reservation manager as described with reference to FIGS. 10 through 13.

At 1715, the UE may determine, after the reserving, the start time of the second COT in the shared radio frequency spectrum band. The operations of 1715 may be performed according to the methods described herein. In some examples, aspects of the operations of 1715 may be performed by a COT manager as described with reference to FIGS. 10 through 13.

At 1720, the UE may identify a timing for the first resource based on the determined start time of the second COT. The operations of 1720 may be performed according to the methods described herein. In some examples, aspects of the operations of 1720 may be performed by a resource reservation manager as described with reference to FIGS. 10 through 13.

At 1725, the UE may transmit, during the second COT, an indication that the first resource is used or unused for retransmission of the first communication. The operations of 1725 may be performed according to the methods described herein. In some examples, aspects of the operations of 1725 may be performed by a SCI manager as described with reference to FIGS. 10 through 13. In some cases, the indication is provided in SCI that is transmitted during the second COT. In some cases, the SCI includes a bitmap that provides the indication, where each bit of the bitmap corresponds to a reserved resource in the second COT.

At 1730, the UE may retransmit the first communication to at least the second UE using the first resource. The operations of 1730 may be performed according to the methods described herein. In some examples, aspects of the operations of 1730 may be performed by a sidelink communications manager as described with reference to FIGS. 10 through 13.

Figure 18:
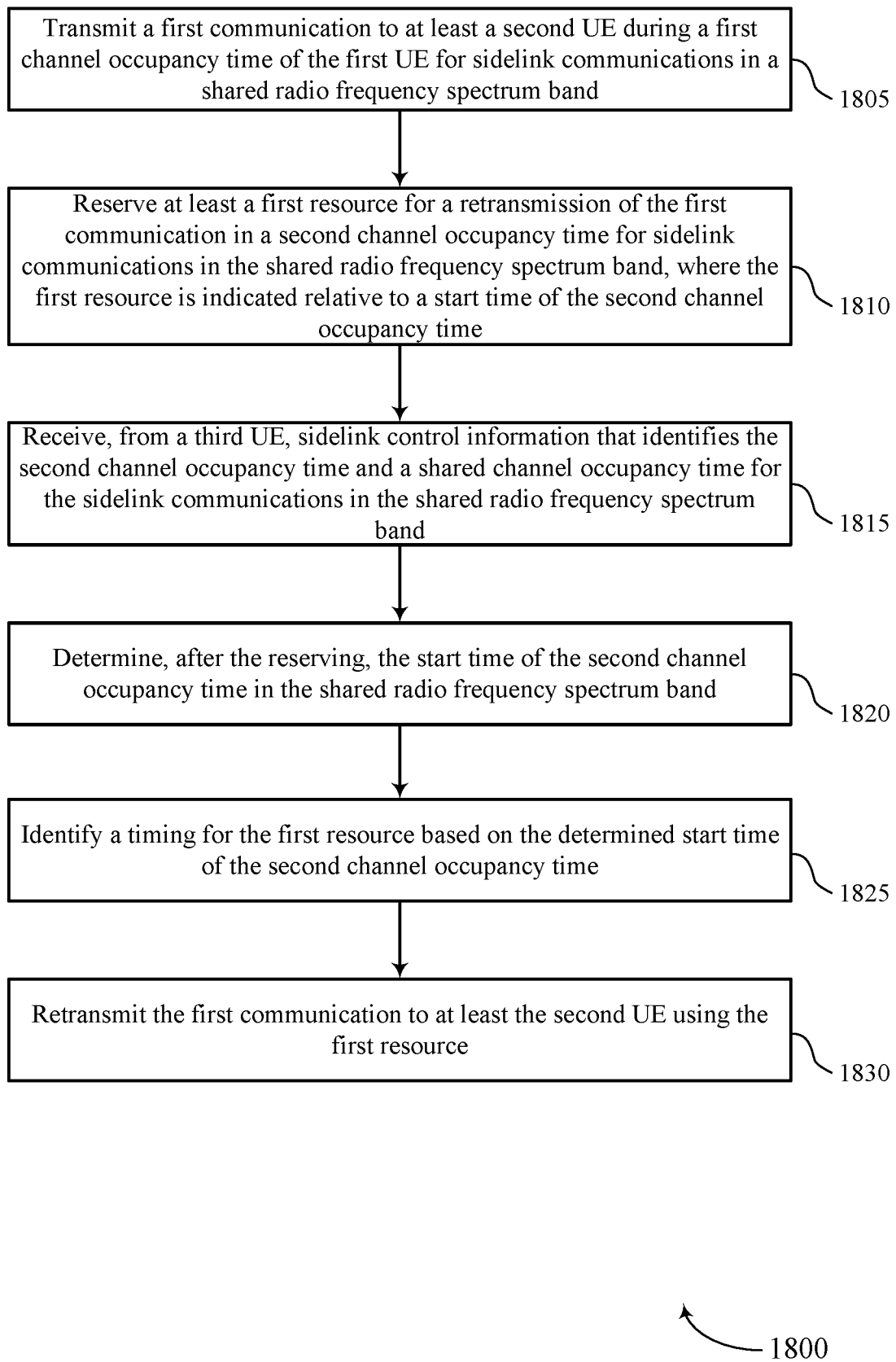

FIG. 18 shows a flowchart illustrating a method 1800 that supports resource reservation for sidelink communications in shared radio frequency spectrum in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 1805, the UE may transmit a first communication to at least a second UE during a first COT of the first UE for sidelink communications in a shared radio frequency spectrum band. The operations of 1805 may be performed according to the methods described herein. In some examples, aspects of the operations of 1805 may be performed by a sidelink communications manager as described with reference to FIGS. 10 through 13.

At 1810, the UE may reserve at least a first resource for a retransmission of the first communication in a second COT for sidelink communications in the shared radio frequency spectrum band, where the first resource is indicated relative to a start time of the second COT. The operations of 1810 may be performed according to the methods described herein. In some examples, aspects of the operations of 1810 may be performed by a resource reservation manager as described with reference to FIGS. 10 through 13.

At 1815, the UE may receive, from a third UE, SCI that identifies the second COT and a shared COT for the sidelink communications in the shared radio frequency spectrum band. The operations of 1815 may be performed according to the methods described herein. In some examples, aspects of the operations of 1815 may be performed by a shared COT manager as described with reference to FIGS. 10 through 13.

At 1820, the UE may determine, after the reserving, the start time of the second COT in the shared radio frequency spectrum band. The operations of 1820 may be performed according to the methods described herein. In some examples, aspects of the operations of 1820 may be performed by a COT manager as described with reference to FIGS. 10 through 13. In some cases, the second COT is obtained based on the SCI from the third UE.

At 1825, the UE may identify a timing for the first resource based on the determined start time of the second COT. The operations of 1825 may be performed according to the methods described herein. In some examples, aspects of the operations of 1825 may be performed by a resource reservation manager as described with reference to FIGS. 10 through 13.

At 1830, the UE may retransmit the first communication to at least the second UE using the first resource. The operations of 1830 may be performed according to the methods described herein. In some examples, aspects of the operations of 1830 may be performed by a sidelink communications manager as described with reference to FIGS. 10 through 13.

Figure 19:
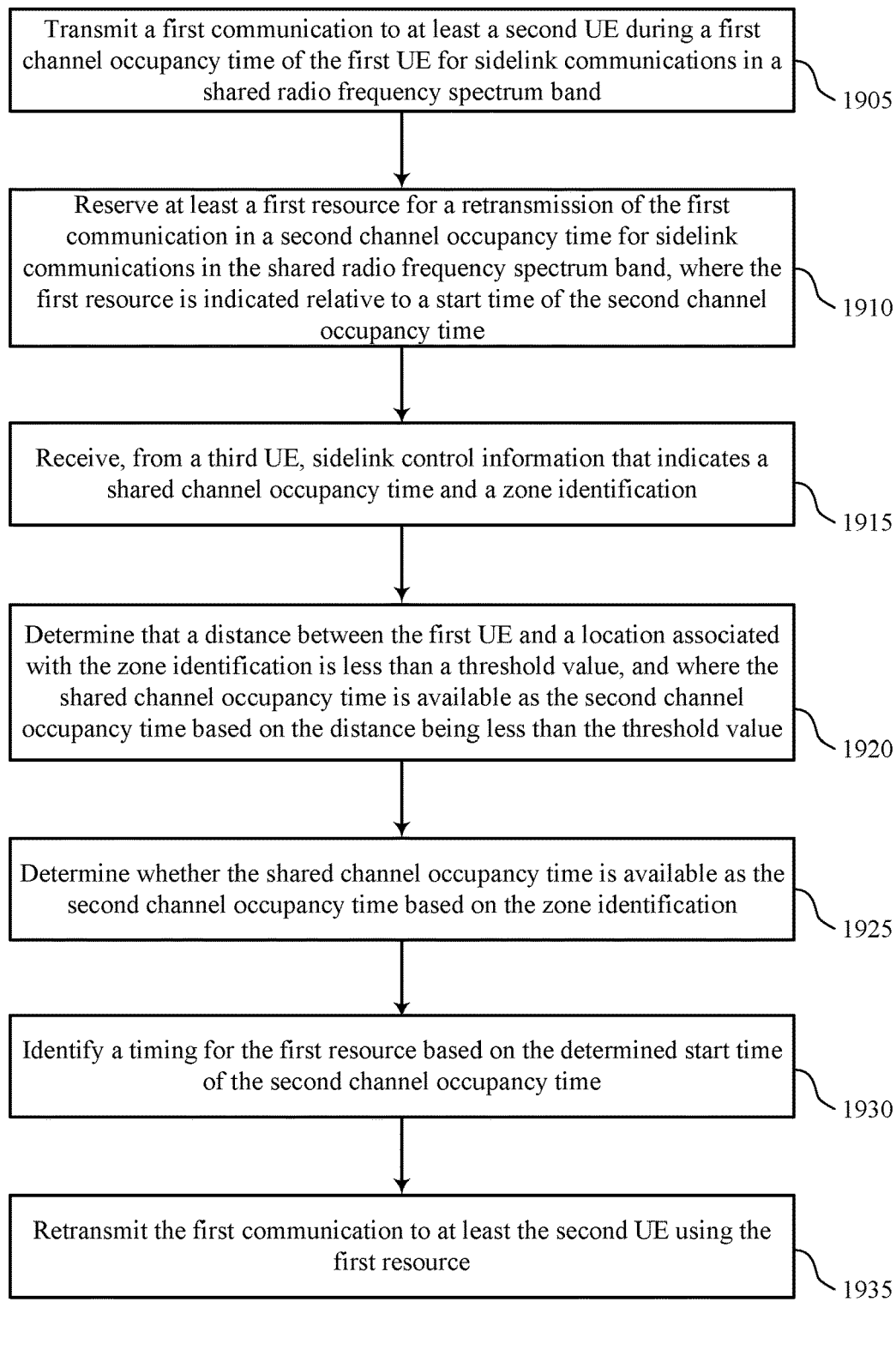

FIG. 19 shows a flowchart illustrating a method 1900 that supports resource reservation for sidelink communications in shared radio frequency spectrum in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 1905, the UE may transmit a first communication to at least a second UE during a first COT of the first UE for sidelink communications in a shared radio frequency spectrum band. The operations of 1905 may be performed according to the methods described herein. In some examples, aspects of the operations of 1905 may be performed by a sidelink communications manager as described with reference to FIGS. 10 through 13.

At 1910, the UE may reserve at least a first resource for a retransmission of the first communication in a second COT for sidelink communications in the shared radio frequency spectrum band, where the first resource is indicated relative to a start time of the second COT. The operations of 1910 may be performed according to the methods described herein. In some examples, aspects of the operations of 1910 may be performed by a resource reservation manager as described with reference to FIGS. 10 through 13.

At 1915, the UE may receive, from a third UE, SCI that indicates a shared COT and a zone identification. The operations of 1915 may be performed according to the methods described herein. In some examples, aspects of the operations of 1915 may be performed by a location manager as described with reference to FIGS. 10 through 13.

At 1920, the UE may determine that a distance between the first UE and a location associated with the zone identification is less than a threshold value, and where the shared COT is available as the second COT based on the distance being less than the threshold value. The operations of 1920 may be performed according to the methods described herein. In some examples, aspects of the operations of 1920 may be performed by a location manager as described with reference to FIGS. 10 through 13.

At 1925, the UE may determine whether the shared COT is available as the second COT based on the zone identification. The operations of 1925 may be performed according to the methods described herein. In some examples, aspects of the operations of 1925 may be performed by a location manager as described with reference to FIGS. 10 through 13.

At 1930, the UE may identify a timing for the first resource based on the determined start time of the second COT. The operations of 1930 may be performed according to the methods described herein. In some examples, aspects of the operations of 1930 may be performed by a resource reservation manager as described with reference to FIGS. 10 through 13.

At 1935, the UE may retransmit the first communication to at least the second UE using the first resource. The operations of 1935 may be performed according to the methods described herein. In some examples, aspects of the operations of 1935 may be performed by a sidelink communications manager as described with reference to FIGS. 10 through 13.

Figure 20:
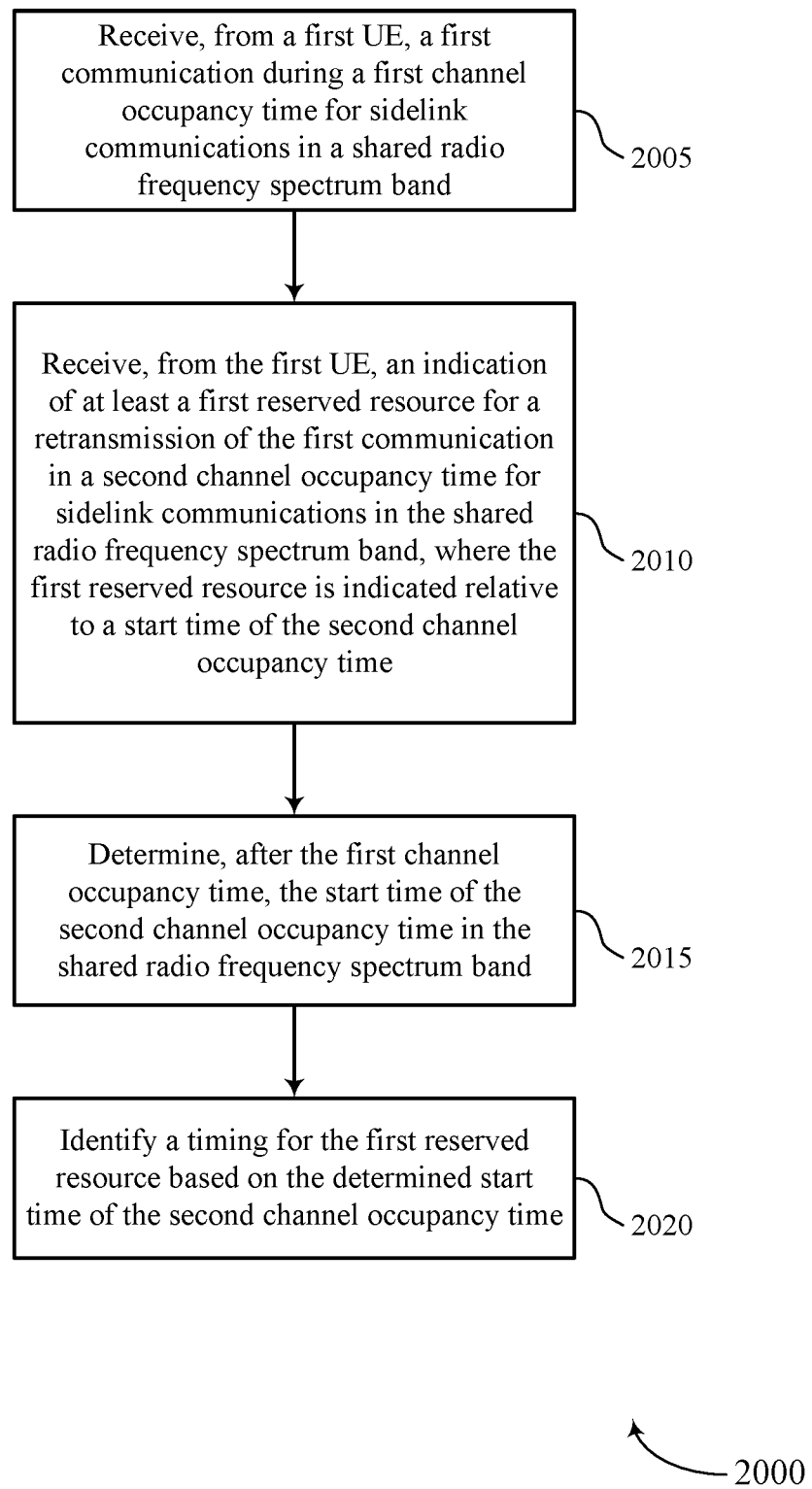

FIG. 20 shows a flowchart illustrating a method 2000 that supports resource reservation for sidelink communications in shared radio frequency spectrum in accordance with aspects of the present disclosure. The operations of method 2000 may be implemented by a UE 115 or its components as described herein. For example, the operations of method 2000 may be performed by a communications manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 2005, the UE may receive, from a first UE, a first communication during a first COT for sidelink communications in a shared radio frequency spectrum band. The operations of 2005 may be performed according to the methods described herein. In some examples, aspects of the operations of 2005 may be performed by a sidelink communications manager as described with reference to FIGS. 10 through 13.

At 2010, the UE may receive, from the first UE, an indication of at least a first reserved resource for a retransmission of the first communication in a second COT for sidelink communications in the shared radio frequency spectrum band, where the first reserved resource is indicated relative to a start time of the second COT. The operations of 2010 may be performed according to the methods described herein. In some examples, aspects of the operations of 2010 may be performed by a resource reservation manager as described with reference to FIGS. 10 through 13.

At 2015, the UE may determine, after the first COT, the start time of the second COT in the shared radio frequency spectrum band. The operations of 2015 may be performed according to the methods described herein. In some examples, aspects of the operations of 2015 may be performed by a COT manager as described with reference to FIGS. 10 through 13.

At 2020, the UE may identify a timing for the first reserved resource based on the determined start time of the second COT. The operations of 2020 may be performed according to the methods described herein. In some examples, aspects of the operations of 2020 may be performed by a resource reservation manager as described with reference to FIGS. 10 through 13.

Figure 21:
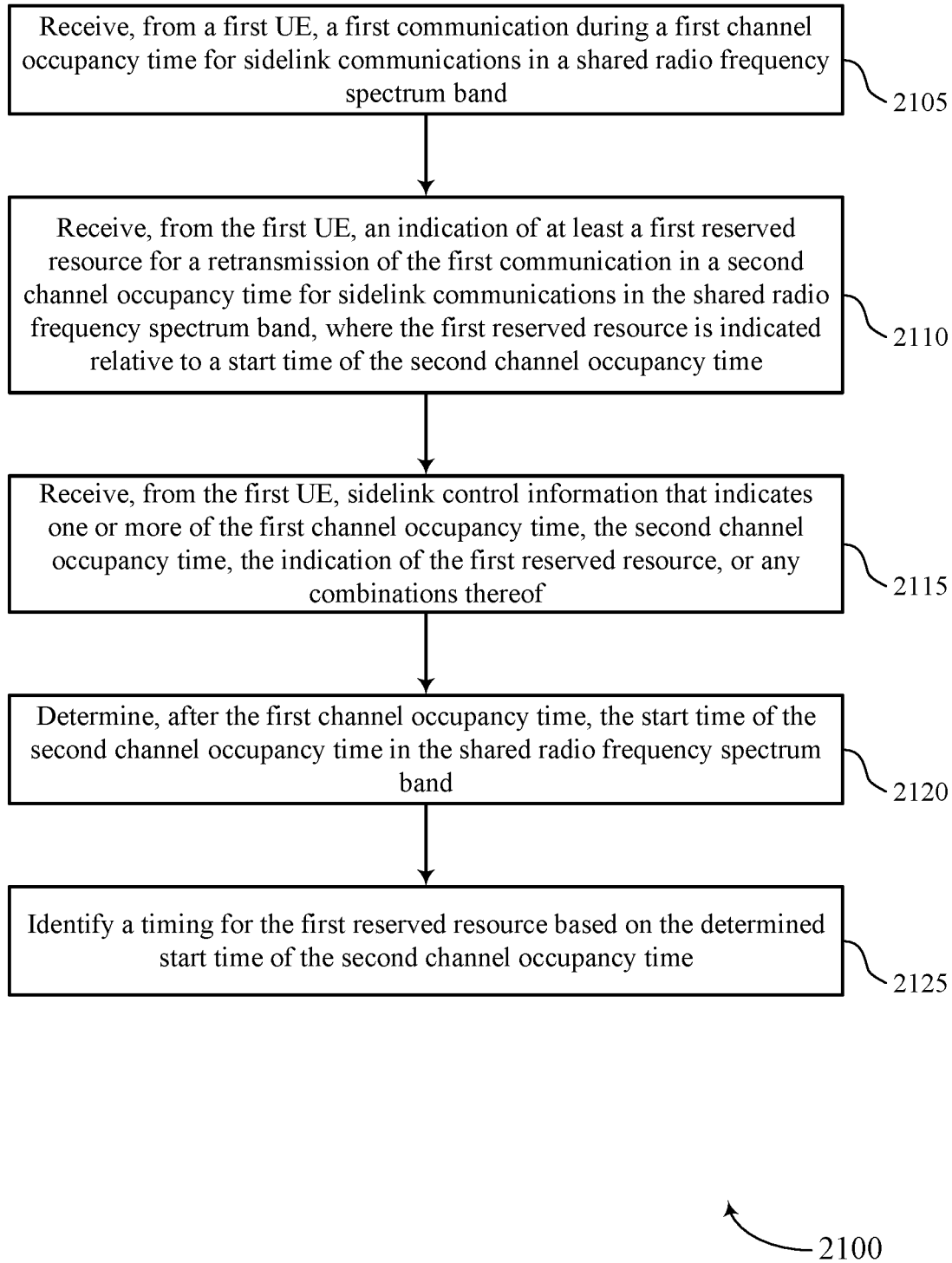

FIG. 21 shows a flowchart illustrating a method 2100 that supports resource reservation for sidelink communications in shared radio frequency spectrum in accordance with aspects of the present disclosure. The operations of method 2100 may be implemented by a UE 115 or its components as described herein. For example, the operations of method 2100 may be performed by a communications manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 2105, the UE may receive, from a first UE, a first communication during a first COT for sidelink communications in a shared radio frequency spectrum band. The operations of 2105 may be performed according to the methods described herein. In some examples, aspects of the operations of 2105 may be performed by a sidelink communications manager as described with reference to FIGS. 10 through 13.

At 2110, the UE may receive, from the first UE, an indication of at least a first reserved resource for a retransmission of the first communication in a second COT for sidelink communications in the shared radio frequency spectrum band, where the first reserved resource is indicated relative to a start time of the second COT. The operations of 2110 may be performed according to the methods described herein. In some examples, aspects of the operations of 2110 may be performed by a resource reservation manager as described with reference to FIGS. 10 through 13.

At 2115, the UE may receive, from the first UE, SCI that indicates one or more of the first COT, the second COT, the indication of the first reserved resource, or any combinations thereof. The operations of 2115 may be performed according to the methods described herein. In some examples, aspects of the operations of 2115 may be performed by a SCI manager as described with reference to FIGS. 10 through 13.

At 2120, the UE may determine, after the first COT, the start time of the second COT in the shared radio frequency spectrum band. The operations of 2120 may be performed according to the methods described herein. In some examples, aspects of the operations of 2120 may be performed by a COT manager as described with reference to FIGS. 10 through 13.

At 2125, the UE may identify a timing for the first reserved resource based on the determined start time of the second COT. The operations of 2125 may be performed according to the methods described herein. In some examples, aspects of the operations of 2125 may be performed by a resource reservation manager as described with reference to FIGS. 10 through 13.

Figure 22:
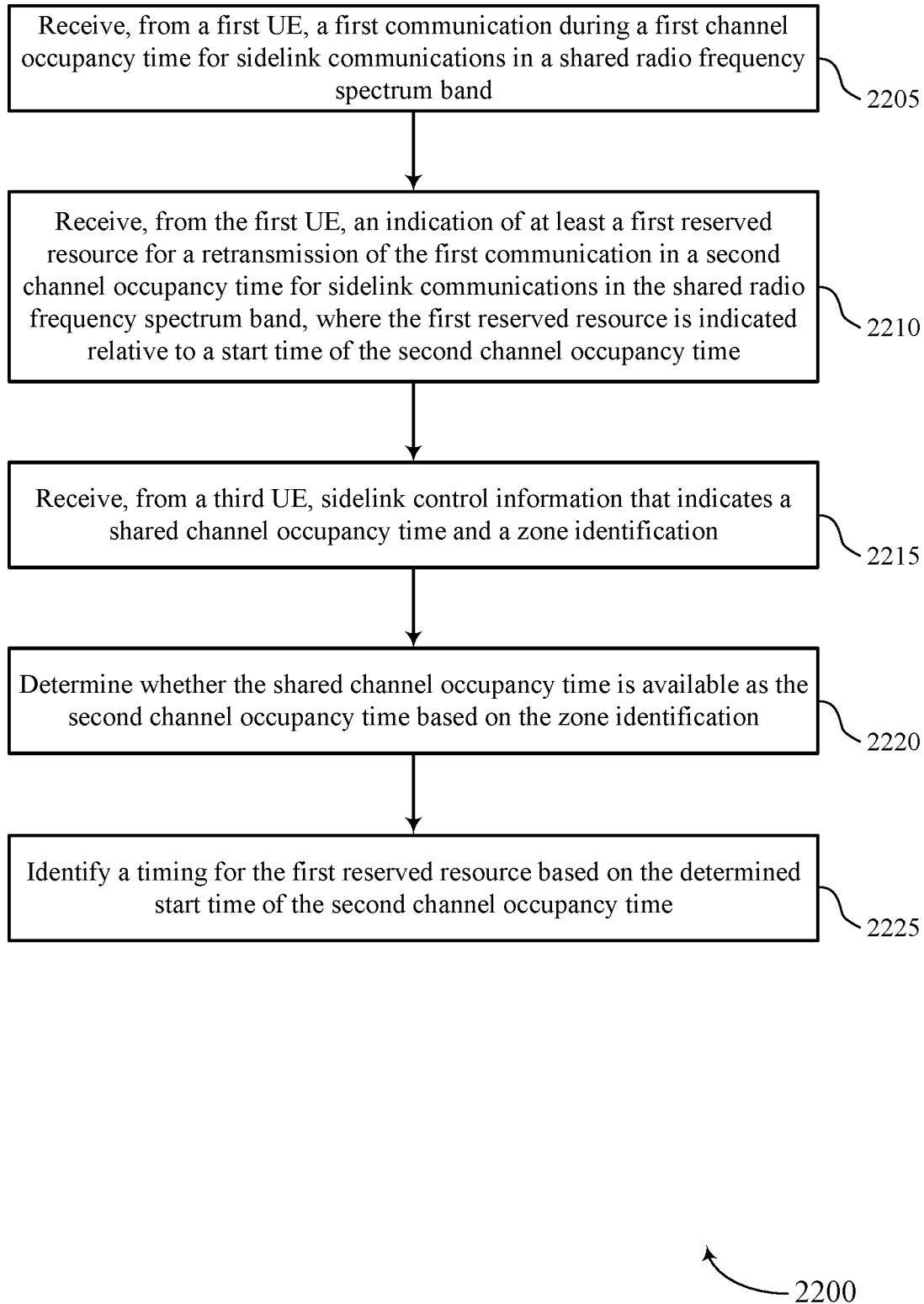

FIG. 22 shows a flowchart illustrating a method 2200 that supports resource reservation for sidelink communications in shared radio frequency spectrum in accordance with aspects of the present disclosure. The operations of method 2200 may be implemented by a UE 115 or its components as described herein. For example, the operations of method 2200 may be performed by a communications manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 2205, the UE may receive, from a first UE, a first communication during a first COT for sidelink communications in a shared radio frequency spectrum band. The operations of 2205 may be performed according to the methods described herein. In some examples, aspects of the operations of 2205 may be performed by a sidelink communications manager as described with reference to FIGS. 10 through 13.

At 2210, the UE may receive, from the first UE, an indication of at least a first reserved resource for a retransmission of the first communication in a second COT for sidelink communications in the shared radio frequency spectrum band, where the first reserved resource is indicated relative to a start time of the second COT. The operations of 2210 may be performed according to the methods described herein. In some examples, aspects of the operations of 2210 may be performed by a resource reservation manager as described with reference to FIGS. 10 through 13.

At 2215, the UE may receive, from a third UE, SCI that indicates a shared COT and a zone identification. The operations of 2215 may be performed according to the methods described herein. In some examples, aspects of the operations of 2215 may be performed by a location manager as described with reference to FIGS. 10 through 13.

At 2220, the UE may determine whether the shared COT is available as the second COT based on the zone identification. The operations of 2220 may be performed according to the methods described herein. In some examples, aspects of the operations of 2220 may be performed by a location manager as described with reference to FIGS. 10 through 13.

At 2225, the UE may identify a timing for the first reserved resource based on the determined start time of the second COT. The operations of 2225 may be performed according to the methods described herein. In some examples, aspects of the operations of 2225 may be performed by a resource reservation manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first UE, comprising: transmitting a first communication to at least a second UE during a first channel occupancy time of the first UE for sidelink communications in a shared radio frequency spectrum band; reserving at least a first resource for a retransmission of the first communication in a second channel occupancy time for sidelink communications in the shared radio frequency spectrum band, wherein the first resource is indicated relative to a start time of the second channel occupancy time; determining, after the reserving, the start time of the second channel occupancy time in the shared radio frequency spectrum band; and retransmitting the first communication to at least the second UE using the first resource, wherein a timing for the first resource is based at least in part on the determined start time of the second channel occupancy time.

Aspect 2: The method of aspect 1, further comprising: transmitting, to one or more other UEs, sidelink control information that indicates one or more of the first channel occupancy time or the second channel occupancy time.

Aspect 3: The method of aspect 2, wherein the transmitting the sidelink control information comprises: transmitting, within the first channel occupancy time, two or more instances of the sidelink control information, wherein each instance of the sidelink control information indicates the first channel occupancy time.

Aspect 4: The method of aspect 3, wherein each instance of the sidelink control information indicates an offset between the instance of the sidelink control information and a start of the first channel occupancy time.

Aspect 5: The method of any of aspects 1 through 4, wherein the reserving the first resource comprises: transmitting, to one or more other UEs, an indication of a relative slot offset between the start time of the second channel occupancy time and the first resource.

Aspect 6: The method of aspect 5, wherein the indication of the relative slot offset between the start time of the second channel occupancy time and the first resource is indicated in a sidelink control information transmission.

Aspect 7: The method of any of aspects 1 through 6, wherein the determining the start time of the second channel occupancy time comprises: determining that a listen-before-talk procedure associated with the second channel occupancy time has obtained the shared radio frequency spectrum band for the sidelink communications; and determining the start time of the second channel occupancy time based at least in part on a completion time of the listen-before-talk procedure.

Aspect 8: The method of any of aspects 1 through 7, wherein the first resource expires based at least in part on a predetermined window after the first communication, and the predetermined window corresponds to a predetermined number of channel occupancy times after the first communication, a predetermined time period after the first communication, or any combinations thereof.

Aspect 9: The method of any of aspects 1 through 8, further comprising: transmitting, during the second channel occupancy time, an indication that the first resource is used or unused for retransmission of the first communication, wherein the indication is provided in sidelink control information that is transmitted during the second channel occupancy time.

Aspect 10: The method of aspect 9, wherein the sidelink control information includes a bitmap that provides the indication, each bit of the bitmap corresponds to a reserved resource in the second channel occupancy time.

Aspect 11: The method of any of aspects 1 through 10, wherein the second channel occupancy time is obtained by a third UE for sidelink communications in the shared radio frequency spectrum band, and wherein the method further comprises: receiving, from the third UE, sidelink control information that identifies the second channel occupancy time and a shared channel occupancy time for the sidelink communications in the shared radio frequency spectrum band.

Aspect 12: The method of aspect 11, wherein the timing of the first resource is based at least in part on the sidelink control information from the third UE, and the first resource is indicated by one or more of a slot offset to a channel occupancy time that is obtained by a different UE, a slot offset to a boundary of the second channel occupancy time that is obtained by the third UE, or a slot offset from a start of the shared channel occupancy time that is indicated by the third UE.

Aspect 13: The method of aspect 12, wherein the sidelink control information from the third UE indicates a duration of the shared channel occupancy time, and the timing of the first resource is determined based at least in part on the duration of the shared channel occupancy time.

Aspect 14: The method of any of aspects 12 through 13, wherein a reservation of the first resource expires based at least in part on a predetermined window after the first communication, one or more shared channel occupancy times subsequent to the first communication, or any combinations thereof.

Aspect 15: The method of any of aspects 1 through 14, further comprising: receiving, from a third UE, sidelink control information that indicates a shared channel occupancy time and a zone identification; and determining whether the shared channel occupancy time is available as the second channel occupancy time based at least in part on the zone identification.

Aspect 16: The method of aspect 15, further comprising: determining that a distance between the first UE and a location associated with the zone identification is less than a threshold value, and wherein the shared channel occupancy time is available as the second channel occupancy time based at least in part on the distance being less than the threshold value.

Aspect 17: A method for wireless communication at a second UE, comprising: receiving, from a first UE, a first communication during a first channel occupancy time for sidelink communications in a shared radio frequency spectrum band; receiving, from the first UE, an indication of at least a first reserved resource for a retransmission of the first communication in a second channel occupancy time for sidelink communications in the shared radio frequency spectrum band, wherein the first reserved resource is indicated relative to a start time of the second channel occupancy time; determining, after the first channel occupancy time, the start time of the second channel occupancy time in the shared radio frequency spectrum band; and identifying a timing for the first reserved resource based at least in part on the determined start time of the second channel occupancy time.

Aspect 18: The method of aspect 17, further comprising: receiving, from the first UE, sidelink control information that indicates one or more of the first channel occupancy time, the second channel occupancy time, the indication of the first reserved resource, or any combinations thereof.

Aspect 19: The method of aspect 18, wherein the first UE transmits two or more instances of the sidelink control information, each instance of the sidelink control information indicates the first channel occupancy time and an offset between the instance of the sidelink control information and a start of a channel occupancy time associated with the sidelink control information.

Aspect 20: The method of any of aspects 17 through 19, wherein the indication of at least the first reserved resource includes a relative slot offset between the start time of the second channel occupancy time and the first reserved resource.

Aspect 21: The method of any of aspects 17 through 20, wherein the first reserved resource expires based at least in part on a predetermined window after the first communication, and the predetermined window corresponds to a predetermined number of channel occupancy times after the first communication, a predetermined time period after the first communication, or any combinations thereof.

Aspect 22: The method of any of aspects 17 through 21, further comprising: receiving, during the second channel occupancy time, an indication that the first reserved resource is used or unused for retransmission of the first communication; and monitoring for the retransmission of the first communication based on the indication that the first reserved resource is used for the retransmission of the first communication.

Aspect 23: The method of any of aspects 17 through 22, wherein the second channel occupancy time is obtained by a third UE for sidelink communications in the shared radio frequency spectrum band, and wherein the method further comprises: receiving, from the third UE, sidelink control information that identifies the second channel occupancy time and a shared channel occupancy time for the sidelink communications in the shared radio frequency spectrum band.

Aspect 24: The method of any of aspects 17 through 23, further comprising: receiving, from a third UE, sidelink control information that indicates a shared channel occupancy time and a zone identification; and determining whether the shared channel occupancy time is available as the second channel occupancy time based at least in part on the zone identification.

Aspect 25: An apparatus for wireless communication at a first UE, comprising a processor; memory coupled with the processor; and instructions stored in the memory and executable by the processor to cause the apparatus to perform a method of any of aspects 1 through 16.

Aspect 26: An apparatus for wireless communication at a first UE, comprising at least one means for performing a method of any of aspects 1 through 16.

Aspect 27: A non-transitory computer-readable medium storing code for wireless communication at a first UE, the code comprising instructions executable by a processor to perform a method of any of aspects 1 through 16.

Aspect 28: An apparatus for wireless communication at a second UE, comprising a processor; memory coupled with the processor; and instructions stored in the memory and executable by the processor to cause the apparatus to perform a method of any of aspects 17 through 24.

Aspect 29: An apparatus for wireless communication at a second UE, comprising at least one means for performing a method of any of aspects 17 through 24.

Aspect 30: A non-transitory computer-readable medium storing code for wireless communication at a second UE, the code comprising instructions executable by a processor to perform a method of any of aspects 17 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   transmitting a first communication to at least a second UE during a first channel occupancy time of the first UE for sidelink communications in a shared radio frequency spectrum band;
   reserving at least a first resource for a retransmission of the first communication in a second channel occupancy time for sidelink communications in the shared radio frequency spectrum band, wherein the first resource is indicated relative to a start time of the second channel occupancy time, and wherein the start time of the second channel occupancy time is based at least in part on a listen before talk procedure associated with the second channel occupancy time;
   determining, after the reserving, the start time of the second channel occupancy time in the shared radio frequency spectrum band; and
   retransmitting the first communication to at least the second UE using the first resource, wherein a timing for the first resource is based at least in part on the determined start time of the second channel occupancy time.

2. The method of claim 1, further comprising:
   transmitting, to one or more other UEs, sidelink control information that indicates one or more of the first channel occupancy time or the second channel occupancy time.

3. The method of claim 2, wherein the transmitting the sidelink control information comprises:
   transmitting, within the first channel occupancy time, two or more instances of the sidelink control information, wherein each instance of the sidelink control information indicates the first channel occupancy time.

4. The method of claim 3, wherein each instance of the sidelink control information indicates an offset between the instance of the sidelink control information and a start of the first channel occupancy time.

5. The method of claim 1, wherein the reserving the first resource comprises:
   transmitting, to one or more other UEs, an indication of a relative slot offset between the start time of the second channel occupancy time and the first resource.

6. The method of claim 5, wherein the indication of the relative slot offset between the start time of the second channel occupancy time and the first resource is indicated in a sidelink control information transmission.

7. The method of claim 1, wherein the determining the start time of the second channel occupancy time comprises:
   determining that the listen-before-talk procedure associated with the second channel occupancy time has obtained the shared radio frequency spectrum band for the sidelink communications; and
   determining the start time of the second channel occupancy time based at least in part on a completion time of the listen-before-talk procedure.

8. The method of claim 1, wherein the first resource expires based at least in part on a predetermined window after the first communication, and wherein the predetermined window corresponds to a predetermined number of channel occupancy times after the first communication, a predetermined time period after the first communication, or any combinations thereof.

9. The method of claim 1, further comprising:
   transmitting, during the second channel occupancy time, an indication that the first resource is used or unused for retransmission of the first communication, wherein the indication is provided in sidelink control information that is transmitted during the second channel occupancy time.

10. The method of claim 9, wherein the sidelink control information includes a bitmap that provides the indication, wherein each bit of the bitmap corresponds to a reserved resource in the second channel occupancy time.

11. The method of claim 1, wherein the second channel occupancy time is obtained by a third UE for sidelink communications in the shared radio frequency spectrum band, and wherein the method further comprises:
    receiving, from the third UE, sidelink control information that identifies the second channel occupancy time and a shared channel occupancy time for the sidelink communications in the shared radio frequency spectrum band.

12. The method of claim 11, wherein the timing of the first resource is based at least in part on the sidelink control information from the third UE, and wherein the first resource is indicated by one or more of a slot offset to a channel occupancy time that is obtained by a different UE, a slot offset to a boundary of the second channel occupancy time that is obtained by the third UE, or a slot offset from a start of the shared channel occupancy time that is indicated by the third UE.

13. The method of claim 12, wherein the sidelink control information from the third UE indicates a duration of the shared channel occupancy time, and wherein the timing of the first resource is determined based at least in part on the duration of the shared channel occupancy time.

14. The method of claim 12, wherein a reservation of the first resource expires based at least in part on a predetermined window after the first communication, one or more shared channel occupancy times subsequent to the first communication, or any combinations thereof.

15. The method of claim 1, further comprising:
receiving, from a third UE, sidelink control information that indicates a shared channel occupancy time and a zone identification; and
determining whether the shared channel occupancy time is available as the second channel occupancy time based at least in part on the zone identification.

16. The method of claim 15, further comprising:
determining that a distance between the first UE and a location associated with the zone identification is less than a threshold value, and wherein the shared channel occupancy time is available as the second channel occupancy time based at least in part on the distance being less than the threshold value.

17. A method for wireless communication at a second user equipment (UE), comprising:
receiving, from a first UE, a first communication during a first channel occupancy time for sidelink communications in a shared radio frequency spectrum band;
receiving, from the first UE, an indication of at least a first reserved resource for a retransmission of the first communication in a second channel occupancy time for sidelink communications in the shared radio frequency spectrum band, wherein the first reserved resource is indicated relative to a start time of the second channel occupancy time, and wherein the start time of the second channel occupancy time is based at least in part on a listen before talk procedure associated with the second channel occupancy time;
determining, after the first channel occupancy time, the start time of the second channel occupancy time in the shared radio frequency spectrum band; and
identifying a timing for the first reserved resource based at least in part on the determined start time of the second channel occupancy time.

18. The method of claim 17, further comprising:
receiving, from the first UE, sidelink control information that indicates one or more of the first channel occupancy time, the second channel occupancy time, the indication of the first reserved resource, or any combinations thereof.

19. The method of claim 18, wherein the first UE transmits two or more instances of the sidelink control information, wherein each instance of the sidelink control information indicates the first channel occupancy time and an offset between the instance of the sidelink control information and a start of a channel occupancy time associated with the sidelink control information.

20. The method of claim 17, wherein the indication of at least the first reserved resource includes a relative slot offset between the start time of the second channel occupancy time and the first reserved resource.

21. The method of claim 17, wherein the first reserved resource expires based at least in part on a predetermined window after the first communication, and wherein the predetermined window corresponds to a predetermined number of channel occupancy times after the first communication, a predetermined time period after the first communication, or any combinations thereof.

22. The method of claim 17, further comprising:
receiving, during the second channel occupancy time, an indication that the first reserved resource is used or unused for retransmission of the first communication; and
monitoring for the retransmission of the first communication based on the indication that the first reserved resource is used for the retransmission of the first communication.

23. The method of claim 17, wherein the second channel occupancy time is obtained by a third UE for sidelink communications in the shared radio frequency spectrum band, and wherein the method further comprises:
receiving, from the third UE, sidelink control information that identifies the second channel occupancy time and a shared channel occupancy time for the sidelink communications in the shared radio frequency spectrum band.

24. The method of claim 17, further comprising:
receiving, from a third UE, sidelink control information that indicates a shared channel occupancy time and a zone identification; and
determining whether the shared channel occupancy time is available as the second channel occupancy time based at least in part on the zone identification.

25. A first user equipment (UE) for wireless communication, comprising:
one or more memories storing processor-executable code; and
one or more processors coupled with the one or more memories and individually or collectively operable to execute the code to cause the first UE to:
transmit a first communication to at least a second UE during a first channel occupancy time of the first UE for sidelink communications in a shared radio frequency spectrum band;
reserve at least a first resource for a retransmission of the first 11 communication in a second channel occupancy time for sidelink communications in the shared radio frequency spectrum band, wherein the first resource is indicated relative to a start time of the second channel occupancy time, and wherein the start time of the second channel occupancy time is based at least in part on a listen before talk procedure associated with the second channel occupancy time;
determine, after the reserving, the start time of the second channel occupancy time in the shared radio frequency spectrum band; and
retransmit the first communication to at least the second UE using the first resource, wherein a timing for the first resource is based at least in part on the determined start time of the second channel occupancy time.

26. The first UE of claim 25, wherein the one or more processors are individually or collectively further operable to execute the code to cause the first UE to:
transmit, to one or more other UEs, sidelink control information that indicates one or more of the first channel occupancy time or the second channel occupancy time.

27. The first UE of claim 26, wherein the one or more processors are individually or collectively further operable to execute the code to cause the first UE to:

transmit, within the first channel occupancy time, two or more instances of the sidelink control information, wherein each instance of the sidelink control information indicates the first channel occupancy time.

28. A second user equipment (UE) for wireless communication, comprising:
one or more memories storing processor-executable code; and
one or more processors coupled with the one or more memories and individually or collectively operable to execute the code to cause the second UE to:
receive, from a first UE, a first communication during a first channel occupancy time for sidelink communications in a shared radio frequency spectrum band;
receive, from the first UE, an indication of at least a first reserved resource for a retransmission of the first communication in a second channel occupancy time for sidelink communications in the shared radio frequency spectrum band, wherein the first reserved resource is indicated relative to a start time of the second channel occupancy time, and wherein the start time of the second channel occupancy time is based at least in part on a listen before talk procedure associated with the second channel occupancy time;
determine, after the first channel occupancy time, the start time of the second channel occupancy time in the shared radio frequency spectrum band; and
identify a timing for the first reserved resource based at least in part on the determined start time of the second channel occupancy time.

29. The second UE of claim 28, wherein the one or more processors are individually or collectively further operable to execute the code to cause the second UE to:
receive, from the first UE, sidelink control information that indicates one or more of the first channel occupancy time, the second channel occupancy time, the indication of the first reserved resource, or any combinations thereof.

30. The second UE of claim 29, wherein the first UE transmits two or more instances of the sidelink control information, wherein each instance of the sidelink control information indicates the first channel occupancy time and an offset between the instance of the sidelink control information and a start of a channel occupancy time associated with the sidelink control information.

* * * * *